(12) United States Patent
Koehler et al.

(10) Patent No.: US 12,219,032 B2
(45) Date of Patent: Feb. 4, 2025

(54) APPARATUSES AND METHODS FOR EDGE COMPUTING APPLICATION DEPLOYMENT

(71) Applicant: Nutanix, Inc., San Jose, CA (US)

(72) Inventors: Heiko Friedrich Koehler, San Jose, CA (US); Keshav Sai Srinivas Nanduri, Milpitas, CA (US); Sandeep Reddy Goli, San Jose, CA (US); Satyam Vaghani, San Jose, CA (US)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 17/141,870

(22) Filed: Jan. 5, 2021

(65) Prior Publication Data

US 2021/0160338 A1    May 27, 2021

Related U.S. Application Data

(63) Continuation of application No. 16/526,816, filed on Jul. 30, 2019, now Pat. No. 10,893,116.

(Continued)

(51) Int. Cl.
*H04L 29/08*    (2006.01)
*H04L 41/0806*    (2022.01)
(Continued)

(52) U.S. Cl.
CPC ........ *H04L 67/565* (2022.05); *H04L 41/0806* (2013.01); *H04L 67/1097* (2013.01)

(58) Field of Classification Search
CPC .............. H04L 67/1097; H04L 67/565; H04L 41/0806; G06F 16/254; G06F 16/256; G06F 16/258; G06F 9/46
See application file for complete search history.

(56) References Cited

U.S. PATENT DOCUMENTS 6,550,057 B1    4/2003  Bowman-Amuah
7,310,664 B1 *  12/2007 Merchant .............. H04W 24/02
                                                        709/220

(Continued)

FOREIGN PATENT DOCUMENTS

CN        110795442 B    4/2022

OTHER PUBLICATIONS

Morabito, Roberto, and Nicklas Beijar. "A framework based on SDN and containers for dynamic service chains on IoT gateways." Proceedings of the Workshop on Hot Topics in Container Networking and Networked Systems. 2017.*

(Continued)

*Primary Examiner* — Chirag R Patel
(74) *Attorney, Agent, or Firm* — Stoel Rives LLP

(57) ABSTRACT

A centralized Internet of Things (IoT) manager of an IoT system is configured generate and deploy a data pipeline application to an edge system. The centralized IoT manager is configured to receive a request for a data category and identification of a data transformation function, identify a data source of the IoT system belonging to the data category, and identify an edge system of the IoT system associated with the data source. The centralized IoT manager is further configured to generate a containerized data pipeline application based on a configuration of the edge system that is configured apply the data transformation function to input data to provide transformed data, and provide the containerized data pipeline application to the edge system.

35 Claims, 9 Drawing Sheets

Related U.S. Application Data

(60) Provisional application No. 62/870,146, filed on Jul. 3, 2019.

(51) Int. Cl.
    *H04L 67/1097*     (2022.01)
    *H04L 67/565*     (2022.01)

(56) References Cited

U.S. PATENT DOCUMENTS

| | | |
|---|---|---|
| 8,549,518 B1 | 10/2013 | Aron et al. |
| 8,601,473 B1 | 12/2013 | Aron et al. |
| 8,850,130 B1 | 9/2014 | Aron et al. |
| 8,863,124 B1 | 10/2014 | Aron |
| 9,009,106 B1 | 4/2015 | Aron et al. |
| 9,069,708 B2 | 6/2015 | Gill et al. |
| 9,244,951 B2 | 1/2016 | Mandelstein et al. |
| 9,336,132 B1 | 5/2016 | Aron et al. |
| 9,600,494 B2 | 3/2017 | Maluf et al. |
| 9,652,265 B1 | 5/2017 | Narayanasamy et al. |
| 9,684,502 B2 | 6/2017 | Fu et al. |
| 9,736,194 B1 | 8/2017 | Rao et al. |
| 9,747,287 B1 | 8/2017 | Bhardwaj et al. |
| 9,769,032 B1 | 9/2017 | Ghodsi et al. |
| 9,772,866 B1 | 9/2017 | Aron et al. |
| 10,156,842 B2 | 12/2018 | Wu et al. |
| 10,225,335 B2 | 3/2019 | Fu et al. |
| 10,489,138 B1 | 11/2019 | Wu et al. |
| 10,515,119 B2 | 12/2019 | Kirk et al. |
| 10,534,629 B1 | 1/2020 | St. Pierre et al. |
| 10,567,925 B2 | 2/2020 | Ly et al. |
| 10,685,295 B1 | 6/2020 | Ross et al. |
| 10,726,302 B2 | 7/2020 | Zhang et al. |
| 10,769,113 B2 | 9/2020 | Jones |
| 10,838,833 B1* | 11/2020 | Jibaja ............... G06F 11/0706 |
| 10,884,808 B2 | 1/2021 | Chintalapally et al. |
| 10,893,116 B1 | 1/2021 | Koehler |
| 10,924,342 B2 | 2/2021 | Joshi et al. |
| 11,108,849 B2 | 8/2021 | Tofighbakhsh et al. |
| 11,178,213 B2* | 11/2021 | Desai ............... H04L 49/9047 |
| 11,194,483 B1 | 12/2021 | Dontu et al. |
| 11,301,762 B1 | 4/2022 | Chen et al. |
| 11,316,733 B1 | 4/2022 | Johson et al. |
| 11,379,525 B1* | 7/2022 | Deutsch ............. G06F 16/9024 |
| 11,397,692 B2 | 7/2022 | Chhabra et al. |
| 11,409,756 B1* | 8/2022 | Park ................... G06F 16/254 |
| 11,422,863 B2 | 8/2022 | Sengupta et al. |
| 11,429,893 B1 | 8/2022 | Tong |
| 11,501,881 B2 | 11/2022 | Patil et al. |
| 11,635,990 B2 | 4/2023 | Singh et al. |
| 11,665,221 B2 | 5/2023 | Joshi et al. |
| 12,021,915 B2 | 6/2024 | Joshi et al. |
| 12,026,551 B2 | 7/2024 | Singh et al. |
| 2002/0143819 A1 | 10/2002 | Han et al. |
| 2004/0177359 A1 | 9/2004 | Bauch et al. |
| 2008/0270515 A1 | 10/2008 | Chen et al. |
| 2009/0204711 A1 | 8/2009 | Binyamin |
| 2009/0260004 A1 | 10/2009 | Datta et al. |
| 2010/0008510 A1 | 1/2010 | Zayas |
| 2010/0077473 A1 | 3/2010 | Takeshita et al. |
| 2010/0175061 A1 | 7/2010 | Maeda et al. |
| 2012/0167081 A1 | 6/2012 | Sedayao et al. |
| 2013/0219479 A1 | 8/2013 | Desoto et al. |
| 2013/0227573 A1* | 8/2013 | Morsi ................... G06F 9/5083 |
| | | 718/100 |
| 2013/0332916 A1 | 12/2013 | Chinn et al. |
| 2014/0164486 A1 | 6/2014 | Ravinchandran et al. |
| 2014/0279899 A1 | 9/2014 | Gu et al. |
| 2015/0057817 A1 | 2/2015 | Endrizzi et al. |
| 2015/0067030 A1 | 3/2015 | Smith et al. |
| 2015/0074106 A1 | 3/2015 | Ji |
| 2015/0261876 A1 | 9/2015 | Trikha et al. |
| 2016/0007138 A1 | 1/2016 | Palanisamy et al. |
| 2016/0094398 A1 | 3/2016 | Choudhary et al. |
| 2016/0098265 A1 | 4/2016 | Mahajan et al. |
| 2016/0202964 A1 | 7/2016 | Butcher et al. |
| 2016/0216959 A1 | 7/2016 | Kurian et al. |
| 2016/0234071 A1 | 8/2016 | Nambiar et al. |
| 2016/0323361 A1 | 11/2016 | Austel et al. |
| 2016/0337175 A1 | 11/2016 | Rao |
| 2016/0342906 A1 | 11/2016 | Shaashua et al. |
| 2016/0357525 A1 | 12/2016 | Wee et al. |
| 2017/0005820 A1 | 1/2017 | Zimmerman et al. |
| 2017/0006135 A1 | 1/2017 | Siebel et al. |
| 2017/0048079 A1 | 2/2017 | Nethi et al. |
| 2017/0060574 A1 | 3/2017 | Malladi et al. |
| 2017/0097950 A1* | 4/2017 | Meacham ........... G06F 16/1873 |
| 2017/0099176 A1 | 4/2017 | Jain |
| 2017/0168813 A1 | 6/2017 | Pogrebinsky et al. |
| 2017/0177877 A1 | 6/2017 | Suarez et al. |
| 2017/0180272 A1 | 6/2017 | Bernath |
| 2017/0180346 A1 | 6/2017 | Suarez et al. |
| 2017/0185507 A1 | 6/2017 | Eberlein |
| 2017/0201411 A1 | 7/2017 | Mladin et al. |
| 2017/0201585 A1 | 7/2017 | Doraiswamy et al. |
| 2017/0212718 A1 | 7/2017 | Nelson et al. |
| 2017/0213157 A1 | 7/2017 | Bugay et al. |
| 2017/0289173 A1 | 10/2017 | Resch et al. |
| 2018/0054490 A1 | 2/2018 | Wadhwa et al. |
| 2018/0101415 A1 | 4/2018 | Mahindru et al. |
| 2018/0109929 A1 | 4/2018 | Ly et al. |
| 2018/0212970 A1 | 7/2018 | Chen et al. |
| 2018/0234351 A1 | 8/2018 | Amento et al. |
| 2018/0295194 A1 | 10/2018 | Deraz et al. |
| 2018/0300124 A1 | 10/2018 | Malladi et al. |
| 2018/0302266 A1 | 10/2018 | Makovsky et al. |
| 2018/0307537 A1 | 10/2018 | Chen et al. |
| 2018/0324204 A1 | 11/2018 | Mcclory et al. |
| 2018/0373419 A1 | 12/2018 | Chen et al. |
| 2019/0014048 A1 | 1/2019 | Krishna Singuru |
| 2019/0034837 A1 | 1/2019 | Lou et al. |
| 2019/0041824 A1 | 2/2019 | Chavez et al. |
| 2019/0045033 A1 | 2/2019 | Agerstam et al. |
| 2019/0098113 A1 | 3/2019 | Park et al. |
| 2019/0114211 A1* | 4/2019 | Reddipalli ........... G06F 16/254 |
| 2019/0123959 A1 | 4/2019 | Joshi et al. |
| 2019/0141022 A1 | 5/2019 | Reeve et al. |
| 2019/0146773 A1 | 5/2019 | Attard |
| 2019/0182333 A1 | 6/2019 | Bartfai-Walcott |
| 2019/0188742 A1 | 6/2019 | Vasudevan et al. |
| 2019/0190776 A1 | 6/2019 | Bregman et al. |
| 2019/0213273 A1 | 7/2019 | Vasudevan et al. |
| 2019/0243836 A1* | 8/2019 | Nanda ................. G06F 16/258 |
| 2019/0251166 A1 | 8/2019 | Penrose et al. |
| 2019/0286353 A1 | 9/2019 | Soni et al. |
| 2019/0295012 A1 | 9/2019 | Marinescu et al. |
| 2019/0320038 A1 | 10/2019 | Walsh et al. |
| 2019/0342182 A1 | 11/2019 | Dhanabalan et al. |
| 2019/0384641 A1 | 12/2019 | Zhao et al. |
| 2020/0014607 A1 | 1/2020 | Gangaadhar et al. |
| 2020/0014633 A1 | 1/2020 | You et al. |
| 2020/0034776 A1 | 1/2020 | Peran et al. |
| 2020/0073739 A1 | 3/2020 | Rungta et al. |
| 2020/0092789 A1 | 3/2020 | Lee et al. |
| 2020/0097274 A1 | 3/2020 | Sarkar et al. |
| 2020/0104723 A1 | 4/2020 | Reissner et al. |
| 2020/0112487 A1 | 4/2020 | Inamdar et al. |
| 2020/0122038 A1 | 4/2020 | Ebrahimi et al. |
| 2020/0126129 A1 | 4/2020 | Lkhamsuren |
| 2020/0127832 A1 | 4/2020 | Ebrahimi |
| 2020/0177630 A1 | 6/2020 | Penner et al. |
| 2020/0192690 A1 | 6/2020 | Gupta et al. |
| 2020/0250002 A1 | 8/2020 | Gururaj et al. |
| 2020/0258627 A1* | 8/2020 | Setegn ................. G16H 10/60 |
| 2020/0274776 A1 | 8/2020 | Nishikawa |
| 2020/0287737 A1 | 9/2020 | Mishra et al. |
| 2021/0042104 A1 | 2/2021 | Tashkandi |
| 2021/0042160 A1 | 2/2021 | Alamouti et al. |
| 2021/0044579 A1 | 2/2021 | Nelson-Gal et al. |
| 2021/0058338 A1* | 2/2021 | Liu ..................... H04L 41/0803 |
| 2021/0067607 A1 | 3/2021 | Gardner et al. |
| 2021/0084670 A1 | 3/2021 | Chauhan et al. |
| 2021/0089408 A1 | 3/2021 | Park et al. |
| 2021/0112059 A1 | 4/2021 | Heldman et al. |

(56) References Cited

U.S. PATENT DOCUMENTS

| | | | |
|---|---|---|---|
| 2021/0140815 | A1 | 5/2021 | Pretorius et al. |
| 2021/0232344 | A1 | 7/2021 | Corrie |
| 2021/0255846 | A1 | 8/2021 | Mamgain et al. |
| 2021/0271565 | A1 | 9/2021 | Bhavanarushi et al. |
| 2021/0311764 | A1 | 10/2021 | Rosoff et al. |
| 2021/0342193 | A1 | 11/2021 | Anand |
| 2021/0373965 | A1 | 12/2021 | Hadas et al. |
| 2021/0400043 | A1 | 12/2021 | Su et al. |
| 2022/0083018 | A1 | 3/2022 | Majeed et al. |
| 2022/0083389 | A1 | 3/2022 | Poothia et al. |
| 2022/0121543 | A1 | 4/2022 | Poothia et al. |
| 2022/0138070 | A1 | 5/2022 | Mokashi et al. |
| 2022/0147336 | A1 | 5/2022 | Joshi et al. |
| 2022/0159093 | A1 | 5/2022 | Joshi et al. |
| 2022/0279046 | A1 | 9/2022 | Perng et al. |
| 2022/0334882 | A1 | 10/2022 | Wang |
| 2023/0070811 | A1 | 3/2023 | Patil et al. |
| 2023/0141808 | A1 | 5/2023 | Joshi et al. |
| 2023/0289225 | A1 | 9/2023 | Singh et al. |

OTHER PUBLICATIONS

Cano, Ignacio et al. "Curator: Self-Managing Storage for Enterprise Clusters"; University of Washington; published Mar. 2017; pp. all.

U.S. Appl. No. 16/526,816 titled "Serverless Data Pipelines for Edge Computing" filed Jul. 30, 2019, pp. all.

Poitras, Steven "The Nutanix Bible" (Jul. 25, 2019), from https://nutanixbible.com/ pp. all.

Poitras, Steven. "The Nutanix Bible" (Jan. 11, 2014), from http://stevenpoitras.com/the-nutanix-bible/ (Publication date based on indicated capture date by Archive.org; first publication date unknown), pp. all.

Poitras, Steven. "The Nutanix Bible" (Jan. 12, 2016), from https://nutanixbible.com/ pp. all.

Poitras, Steven. "The Nutanix Bible" (Oct. 15, 2013), from http://stevenpoitras.com/the-nutanix-bible/ (Publication date based on indicated capture date by Archive.org; first publication date unknown), pp. all.

Poitras, Steven. "The Nutanix Bible" (Jun. 20, 2014), from http://stevenpoitras.com/the-nutanix-bible/ (Publication date based on indicated capture date by Archive.org; first publication date unknown), pp. all.

Poitras, Steven. "The Nutanix Bible" (Jun. 25, 2018), from https://nutanixbible.com/ pp. all.

Poitras, Steven. "The Nutanix Bible" (Jan. 3, 2017), from https://nutanixbible.com/ pp. all.

Poitras, Steven. "The Nutanix Bible" (Jan. 3, 2018), from https://nutanixbible.com/ pp. all.

Poitras, Steven. "The Nutanix Bible" (Sep. 4, 2015), from https://nutanixbible.com/ pp. all.

Poitras, Steven. "The Nutanix Bible" (Jan. 7, 2015), from http://stevenpoitras.com/the-nutanix-bible/ (Publication date based on indicated capture date by Archive.org; first publication date unknown), pp. all.

Poitras, Steven. "The Nutanix Bible" (Jan. 8, 2019), from https://nutanixbible.com/ pp. all.

Poitras, Steven. "The Nutanix Bible" (Jun. 8, 2017), from https://nutanixbible.com/ pp. all.

Poitras, Steven. "The Nutanix Bible" (Jun. 9, 2015), from http://stevenpoitras.com/the-nutanix-bible/ (Publication date based on indicated capture date by Archive.org; first publication date unknown), pp. all.

Poitras, Steven. "The Nutanix Bible" (Jun. 9, 2016), from https://nutanixbible.com/ pp. all.

Poitras, Steven. "The Nutanix Bible" (Sep. 17, 2019), from https://nutanixbible.com/ pp. all.

Poitras, Steven. "The Nutanix Bible" (Mar. 2, 2020), from https://nutanixbible.com/ pp. all.

Poitras, Steven. "The Nutanix Bible" (Sep. 1, 2020), from https://nutanixbible.com/ pp. all.

"Anthos", Google Cloud https://cloud.google.com/anthos, Apr. 21, 2020, pp. 1-26.

"Architecting For The Cloud: AWS Best Practice", Amazon Web Services https://d1.awsstatic.com/whitepapers/AWS_Cloud_Best_Practices.pdf, Oct. 2018, pp. 1-50.

"Best Practices for Cloud Management", Service Now https://www.servicenow.com/content/dam/servicenow-assets/public/en-us/doc-type/resource-center/solution-brief/sb-cloud-management.pdf, Jun. 2017, pp. 1-2.

"Cisco Edge Intelligence At-a-Glance", Cisco https://www.cisco.com/c/en/us/solutions/collateral/internet-of-things/at-a-glance-c45-743263.html, Nov. 3, 2020, pp. 1-3.

"Cisco Edge Intelligence Data Sheet", Cisco https://www.cisco.com/c/en/us/solutions/collateral/internet-of-things/datasheet-c78-743838.html, Aug. 17, 2020, pp. 1-8.

"Hybrid Cloud with AWS", AWS https://d1.awsstatic.com/whitepapers/hybrid-cloud-with-aws.pdf, Nov. 2020, pp. 1-20.

IBM Edge Application Manager, IBM https://www.ibm.com/cloud/edge-application-manager, May 5, 2020.

"IoT at the Edge: Bringing intelligence to the edge using Cloud IoT (Cloud Next '18)", YouTube; Google Cloud Tech https://www.youtube.com/watch?v=-T9MNR-BI8I, Aug. 17, 2018, p. 1.

"mPRM: An Overview", ProSyst http://documentation.bosch-si.com/iot/PRM/v6.0/welcome/mprm_functional.html, Jun. 13, 2017, pp. 1-3.

"Multicloud Application Patterns", VMWare Docs https://docs.vmware.com/en/VMware-Tanzu-Service-Mesh/services/concepts-guide/GUID-4123C2ED-EC61-4CDA-A38D-2A7454BDDA46.html, Jul. 7, 2020, pp. 1-2.

"Setting up ServiceNow Cloud Management", DxSherpa https://dxsherpa.com/blogs/setting-up-servicenow-cloud-management/, Jul. 19, 2018, pp. 1-10.

"Video—Intro to IBM Edge Application Manager", IBM https://www.ibm.com/cloud/blog/intro-to-ibm-edge-application-manager, May 13, 2020, pp. 1-16.

"Welcome to Azure Arc", YouTube, Microsoft Azure https://www.youtube.com/watch?v=3zdJJ97pNT4, Feb. 19, 2020, p. 1.

"What is Anthos?", YouTube, Google Cloud Tech https://www.youtube.com/watch?v=Qtwt7QcW4J8, Apr. 21, 2020, p. 1.

Carey, Scott , "The major hybrid cloud options compared: AWS Outposts vs Azure Stack vs Google Anthos", ComputerWorld https://www.computerworld.com/article/3428108/the-major-hybrid-cloud-options-compared-aws-outposts-vs-azure-stack-vs-google-anthos.html, Nov. 6, 2019, pp. 1-9.

Holzle, Urs , et al., "Introducing Anthos: An entirely new platform for managing applications in today's multi-cloud world", Google Cloud Blog https://cloud.google.com/blog/topics/hybrid-cloud/new-platform-for-managing-applications-in-todays-multi-cloud-world, Apr. 9, 2019, pp. 1-6.

Iyengar, Ashok , et al., "Clusters at the Edge", IBM https://www.ibm.com/cloud/blog/clusters-at-the-edge, Dec. 9, 2020, pp. 1-13.

Lewis, Sarah , "Cloudify", TechTarget https://www.techtarget.com/searchcloudcomputing/definition/Cloudify, Jun. 2019, p. 1.

Manicka, Naveen , et al., "Simplify IoT Edge-to-Multi-Cloud Data Flow with Cisco Edge Intelligence", Cisco | Cisco Blogs https://blogs.cisco.com/developer/edge-intelligence-sandbox-lab, Aug. 6, 2020, pp. 1-7.

Marko, Kurt , "SAP to the fore as Cloud Foundry grows into the preferred platform for cloud-native enterprise apps", Diginomica https://diginomica.com/cloud-foundry-growing-preferred-platform-cloud-native-enterprise-applications, Jun. 19, 2017, pp. 1-10.

Mohamed, Riaz , "Deploy Cloud Agnostic Applications with VMware vRealize Automation Cloud", VMWare Cloud Management https://blogs.vmware.com/management/2019/09/cloud-agnostic-apps-vra-cloud.html, Sep. 17, 2019, pp. 1-10.

Msv, Janakiram , "Google Forays Into Edge Computing With Cloud IoT Edge And TPU", Forbes https://www.forbes.com/sites/janakirammsv/2018/07/30/google-forays-into-edge-computing-through-cloud-iot-edge-and-tpu/?sh=5e68b3fc6005, Jul. 30, 2018, pp. 1-4.

Msv, Janakiram , "Why Azure Arc Is A Game Changer For Microsoft", Forbes https://www.forbes.com/sites/janakirammsv/

(56) References Cited

OTHER PUBLICATIONS

2019/11/05/why-azure-arc-is-a-game-changer-for-microsoft/?sh=373f5c854307, Nov. 5, 2019, pp. 1-10.
Nolle, Tom, "Guide to Google Anthos architecture and management", TechTarget https://www.techtarget.com/searchcloudcomputing/tip/Guide-to-Google-Anthos-architecture-and-management, Aug. 27, 2020, pp. 1-7.
Poccia, Danilo, "New—AWS IoT Greengrass Adds Container Support and Management of Data Streams at the Edge", AWS | AWS News Blog https://aws.amazon.com/blogs/aws/new-aws-iot-greengrass-adds-docker-support-and-streams-management-at-the-edge/, Nov. 25, 2019, pp. 1-7.
Stakun, Jaroslaw, "Introduction to Red Hat OpenShift Container Platform", Open Virtualization Pro https://www.openvirtualization.pro/red-hat-openshift-container-platform/, Apr. 26, 2019, p. 1.
Wiggers, Steef-Jan, "Google Cloud Platform Release Edge TPU and Cloud IoT Edge", InfoQ https://www.infoq.com/news/2018/07/google-iot-edge-tpu-ai/, Jul. 30, 2018, pp. 1-4.
"Available Supporting Components", https://docs.openshift.com/container-platform/4.1/architecture/understanding-development.html#supporting-components retrieved May 27, 2022 relevant to OpenShift Container Platform 4.1 general availability Jun. 4, 2019, pp. 1-2.
"Comprehensive Guide on Upgrading PKS", PKS 1.3, Apr. 2019, pp. 1-45.
"How to Troubleshoot PKS Upgrade Issues", VMware Tanzu Support Hub https://community.pivotal.io/s/article/how-to-troubleshoot-pks-upgrade-issues?language=en_US, Jul. 17, 2019, pp. 1-11.
"Journey to OpenShift in a Multi-Cloud Environment, Part 3", RedHat Hybrid Cloud | Blog https://cloud.redhat.com/blog/journey-openshift-multi-cloud-environment-part-3, Jan. 2, 2018, pp. 1-4.
"OpenShift Container Platform Architecture", https://docs.openshift.com/container-platform/4.1/architecture/architecture.html retrieved May 27, 2022 relevant to OpenShift Container Platform 4.1 general availability Jun. 4, 2019, pp. 1-11.
"OpenShift Container Platform installation overview", https://docs.openshift.com/container-platform/4.1/architecture/architecture-installation.html retrieved May 27th relevant to OpenShift Container Platform 4.1 general availability Jun. 4, 2019, pp. 1-13.
"Overview: OpenShift Container Platform", https://docs.openshift.com/container-platform/3.9/getting_started/index.html retrieved May 24th relevant to OpenShift Container Platform 3.9 general availability Oct. 2018, pp. 1-2.
"Overview: OpenShift v3", https://docs.openshift.com/container-platform/3.9/architecture/index.html retrieved May 24, 2022 relevant to OpenShift Container Platform 3.9 general availability Oct. 2018, pp. 1-9.
"Overview: Templates", https://docs.openshift.com/container-platform/3.9/dev_guide/templates.html retrieved May 24, 2022 relevant to OpenShift Container Platform 3.9 general availability Oct. 2018, pp. 1-27.
"Pivotal CF 1.3 App Dashboard and Usage Reports", YouTube https://www.youtube.com/watch?v=jpGUbjh8IUY, Sep. 25, 2014, p. 1.
"Pivotal Cloud Foundry Documentation", Pivotal Version 2.0 https://resources.docs.pivotal.io/pdfs/pcf-docs-2.0.pdf, Dec. 20, 2018, pp. 1-1591.
"Pivotal Container Service Overview", Slideshare https://www.slideshare.net/Pivotal/pivotal-container-service-overview, Jul. 16, 2019, pp. 1-78.
"Red Hat Enterprise Linux CoreOS (RHCOS)", https://docs.openshift.com/container-platform/4.1/architecture/architecture-rhcos.html retrieved May 27, 2022 relevant to OpenShift Container Platform 4.1 general availability Jun. 4, 2019, pp. 1-16.
"Service Catalog", https://docs.openshift.com/container-platform/3.9/architecture/service_catalog/index.html retrieved May 24, 2022 relevant to OpenShift Container Platform 3.9 general availability Oct. 2018, pp. 1-9.
"Template Service Broker", https://docs.openshift.com/container-platform/3.9/architecture/service_catalog/template_service_broker.html retrieved May 24, 2022 relevant to OpenShift Container Platform 3.9 general availability Oct. 2018, pp. 1-2.
"The Service Mesh Era: Architecting, Securing and Managing Microservices with Istio", Google Cloud https://services.google.com/fh/files/misc/the_service_mesh_era_architecting_securing_and_managing_microservices_with_istio_white_paper.pdf, Feb. 5, 2019, pp. 1-40.
"The Service Mesh Era: Architecting, Securing and Managing Microservices with Istio", Google Cloud https://services.google.com/fh/files/misc/the_service_mesh_era_architecting_securing_and_managing_microservices_with_istio_white_paper.pdf, Mar. 6, 2019, pp. 6-40.
"The Service Mesh Era: Architecting, Securing and Managing Microservices with Istio", Google Cloud https://services.google.com/fh/files/misc/the_service_mesh_era_architecting_securing_and_managing_microservices_with_istio_white_paper.pdf, Jan. 22, 2019, pp. 1-40.
"Understanding OpenShift Container Platform development", https://docs.openshift.com/container-platform/4.1/architecture/understanding-development.html retrieved May 27, 2022 relevant to OpenShift Container Platform 4.1 general availability Jun. 4, 2019, pp. 1-18.
"VMware Enterprise PKS Architecture Overview", YouTube https://www.youtube.com/watch?v=504FGHukY8Y, Feb. 9, 2018, pp. 1.
Banka, Roank, "Pivotal CloudFoundry on Google cloud platform", Slideshare https://www.slideshare.net/Pivotal/pivotal-container-service-overview, Jul. 16, 2018, pp. 1-44.
Ben-David, Jacob, "Google Cloud's Anthos—Everything You Need To Know", Turbonomic Blog https://blog.turbonomic.com/google-clouds-anthos, Apr. 15, 2019, pp. 1-9.
Holzle, Urs, et al., "Introducing Anthos: An entirely new platform for managing applications in today's multi-cloud world", Google Cloud https://cloud.google.com/blog/topics/hybrid-cloud/new-platform-for-managing-applications-in-todays-multi-cloud-world, Apr. 9, 2019, pp. 1-7.
Islam, Tariq, et al., "5 frequently asked questions about Google Cloud Anthos", Google Cloud https://cloud.google.com/blog/topics/hybrid-cloud/5-frequently-asked-questions-about-google-cloud-anthos, Jun. 20, 2019, pp. 1-5.
O'Keefe, Megan, "Welcome to the service mesh era: Introducing a new Istio blog post series", Google Cloud https://cloud.google.com/blog/products/networking/welcome-to-the-service-mesh-era-introducing-a-new-istio-blog-post-series, Jan. 22, 2019, pp. 1-5.
Reid, Nate, "Upgrading VMware Enterprise PKS 1.2 to 1.3", YouTube https://www.youtube.com/watch?v=7pAxNWIxVLM, Jan. 28, 2019, p. 1.
Schonbaum, Iftach, "Anthos—Google's Enterprise Hybrid & Multi-Cloud Platform", CloudZone https://medium.com/cloudzone/anthos-googles-enterprise-hybrid-multi-cloud-platform-7975e05a7729, Apr. 23, 2019, pp. 1-7.
U.S. Appl. No. 18/047,623 titled "Common Services Model for Multi-Cloud Platform" filed Oct. 18, 2022.
"Comprehensive Guide on Upgrading PKS", PKS 1.3 https://kb.vmware.com/sfc/servlet.shepherd/version/download/068f4000009EfWPAA0, Apr. 2019, pp. 1-45.
Banka, Roank, "Pivotal CloudFoundry on Google cloud platform", Slideshare https://www.slideshare.net/RonakBanka/pcfgcpgoogleioextended, Jul. 16, 2018, pp. 1-44.
Paladi, Nicolae, et al., "Domain Based Storage Protection with Secure Access Control for the Cloud", https://dl.acm.org/doi/pdf/10.1145/2600075.2600082, 2014, pp. 35-42.
Benson, Mark, "Technical Introduction to VMware Unified Access Gateway for Horizon Secure Remote Access", VMWare | https://blogs.vmware.com/euc/2015/09/what-is-vmware-unified-access-gateway-secure-remote-access.html, Sep. 9, 2015, p. 8.
Iyengar, Ashok, et al., "Automation at the Edge", https://www.ibm.com/cloud/blog/automation-at-the-edge, Feb. 18, 2017, pp. 1-13.
Iyengar, Ashok, "Cloud at the Edge", https://www.ibm.com/cloud/blog/cloud-at-the-edge, Feb. 26, 2019, pp. 1-9.
Iyengar, Ashok, "DevOps at the Edge", https://www.ibm.com/cloud/blog/devops-at-the-edge, Dec. 3, 2015, pp. 1-13.
Iyengar, Ashok, "GitOps at the Edge", https://www.ibm.com/cloud/blog/gitops-at-the-edge, Nov. 2, 2017, pp. 1-13.

(56) References Cited

OTHER PUBLICATIONS

Iyengar, Ashok, et al., "Rounding Out the Edges", https://www.ibm.com/cloud/blog/rounding-out-the-edges, May 7, 2019, pp. 1-11.

Tamura, Yoshi, "GPUs as a service with Kubernetes Engine are now generally available", Google Cloud | https://cloud.google.com/blog/products/gcp/gpus-service-kubernetes-engine-are-now-generally-available, Jun. 19, 2018, pgs.

Wiggers, Steef-Jan, "Google Kubernetes Engine 1.10 Is Generally Available and Enterprise Ready", InfoQ | https://www.infoq.com/news/2018/06/google-kubernetes-engine-1.10-ga, Jun. 1, 2018, p. 4.

"Architecting VMware Unified Access Gateway", https://www.youtube.com/watch?v=URSdJ9qCQKo&t=234s, Apr. 17, 2019, p. 1.

"AWS Architecture Monthly—Internet of Things Jun. 2019", AWS | https://d1.awsstatic.com/whitepapers/architecture-monthly/AWS-Architecture-Monthly-June-2019.pdf, Jun. 2019.

"AWS IoT Greengrass", https://web.archive.org/web/20190624094650/https:/aws.amazon.com/greengrass/, Jun. 2019, pp. 1-13.

"AWS IoT vs. Google IoT vs. Azure IoT", Bizety | https://www.bizety.com/2018/08/28/aws-iot-vs-google-iot-vs-azure-iot/, Aug. 28, 2018, pp. 1-7.

"Azure IoT Central intro walkthrough", https://www.youtube.com/watch?v=G32stXSwtyA&ab_channel=MicrosoftDeveloper, Feb. 2018.

"Cloud Iot Core", https://web.archive.org/web/20190129000453/https:/cloud.google.com/iot-core/, Jan. 2019, pp. 1-10.

"Cloud IoT Core—Devices, configuration, and state", Google | https://web.archive.org/web/20190330153113/https://cloud.google.com/iot/docs/concepts/devices, Mar. 2019.

"Cloud Iot Core Private Beta", Google | https://web.archive.org/web/20170518022234/https://cloud.google.com/iot-core/, May 2017.

"Deploying and Configuring VMware Unified Access Gateway", VMware | Unified Access Gateway 3.1 https://techzone.vmware.com/configuring-edge-services-vmware-unified-access-gateway-vmware-workspace-one-operational-tutorial#overview, Oct. 27, 2017, pp. 1-89.

"Extended offline operation with Azure IoTEdge", Microsoft | https://azure.microsoft.com/en-us/blog/extended-offline-operation-with-azure-iot-edge/, Sep. 2018.

"Google Cloud IoT Core", Google | https://www.slideshare.net/idof/google-cloud-iot-core, Sep. 2018.

"Introducing Google Cloud IoT Core: forsecurely connecting and managing loTdevices at scale", Google Cloud | https://cloud.google.com/blog/products/gcp/introducing-google-cloud-iot-core-for-securely-connecting-and-managing-iot-devices-at-scale, May 2017.

"IoT Core device-to-device communication", Google |https://cloud.google.com/community/tutorials/iot-device-to-device, Dec. 2017.

"IoT Partner Quickstart", https://services.google.com/fh/files/misc/iot_partner_quickstart1.0.pdf, Nov. 15, 2018, pp. 1-13.

"Meeting at the Edge with VMware Internet of Things (IoT)", https://blogs.vmware.com/edge/files/2017/04/Meeting-at-the-Edge.pdf, Apr. 2017, pp. 1-9.

"Microsoft Azure IoT Reference Architecture", Version 2.0 Release, May 2, 2018, pp. 1-79.

"Microsoft IoT Central delivers low-code wayto build IoT solutions fast", Microsoft | https://azure.microsoft.com/en-us/blog/microsoft-iot-central-delivers-low-code-way-to-build-iot-solutions-fast/, Dec. 2017.

"Mobile Content Management", VMWare | https://www.vmware.com/content/dam/digitalmarketing/vmware/en/pdf/workspace-one/vmware-airwatch-mcm-datasheet.pdf, Dec. 2019, pp. 1-4.

"Neo-AI-DLR is a common runtime for machine learning models compiled by AWS SageMaker Neo, TVM, or TreeLite.", GitHub | https://github.com/neo-ai/neo-ai-dlr, Dec. 1, 2020, pp. 1-4.

"Release Notes for VMware Unified Access Gateway 3.1 and 3.1.1", https://docs.vmware.com/en/Unified-Access-Gateway/3.1/rn/unified_access_gateway-31-release-notes.html, Oct. 27, 2017, pp. 1-4.

"Unified Access Gateway Architecture", https://techzone.vmware.com/resource/unified-access-gateway-architecture, Nov. 2020, pp. 1-18.

"What is AWS IoT?", AWS | Youtube: https://www.youtube.com/watch?v=WAp6FHbhYCk&ab_channel=AmazonWebServices Timestamp 4:55/10:08, Jan. 2018.

"What is IoT Edge?", Code Project | https://www.codeproject.com/Articles/1261285/What-is-IoT-Edge, Sep. 2018, pp. 1-9.

Avram, Abel, "AWS Greengrass Runs Lambda Functions on IoT Devices", InfoQ | https://www.infoq.com/news/2017/06/aws-greengrass/, Jun. 8, 2017, pp. 1-2.

Chi, Chrissie, "Enabling more device management scenarios with new features in IoT Hub", Microsoft Azure | https://azure.microsoft.com/en-us/blog/enabling-more-device-management-scenarios-with-new-features-in-iot-hub/, May 7, 2018, pp. 1-6.

Lobo, Savia, "Microsoft Azure IoT Edge is open source and generally available!", PacktHub | https://hub.packtpub.com/microsoft-azure-iot-edge-is-open-source-and-generally-available/, Jun. 29, 2018, pp. 1-2.

Msv, Janakiram, "5 Reasons Why Azure IoT Edge Is Industry's Most Promising Edge Computing Platform", Forbes https://www.forbes.com/sites/janakirammsv/2018/07/01/5-reasons-why-azure-iot-edge-is-industrys-most-promising-edge-computing-platform/?sh=56b9ef223249, Jul. 2, 2018, pp. 1-5.

Msv, Janakiram, "Azure IoT Edge: A Technology Primer", TheNewStack | https://thenewstack.io/azure-iot-edge-a-technology-primer/, Sep. 14, 2018, pp. 1-9.

Oleniczak, Kevin, "Using AWS IoT for Predictive Maintenance", AWS | https://aws.amazon.com/blogs/iot/using-aws-iot-for-predictive-maintenance/, Jun. 28, 2018, pp. 1-6.

Param, Sunil, "Google's Coral: A new product development platform with local AI", TechGig | https://content.techgig.com/technology/googles-coral-a-new-product-development-platform-with-local-ai/articleshow/69042955.cms, Apr. 26, 2019, pp. 1-18.

Rhee, Injong, "Bringing intelligence to the edge with Cloud IoT", Google Cloud | https://cloud.google.com/blog/products/gcp/bringing-intelligence-edge-cloud-iot, Jul. 25, 2018, pp. 1-7.

Vanderzyden, John, "Using AWS Greengrass to Enable IoT Edge Computing", mabl | https://www.mabl.com/blog/using-aws-greengrass-enable-iot-edge-computing, Aug. 23, 2017, pp. 1-12.

Wiggers, Kyle, "Microsoft launches Azure IoT Edge out of preview", VentureBeat | https://venturebeat.com/mobile/microsoft-launches-azure-iot-edge-out-of-preview/, Jun. 27, 2018, pp. 1-6.

Yamashita, Teppei, "Real-time data processing with IoT Core", Google Cloud | https://cloud.google.com/community/tutorials/cloud-iot-rtdp, Apr. 2018, pp. 1-19.

Zhang, Xinyi, "Create a CI/CD pipeline for your IoT Edge solution with Azure DevOps", Microsoft | https://devblogs.microsoft.com/iotdev/create-a-ci-cd-pipeline-for-your-iot-edge-solution-with-azure-devops/, Oct. 29, 2018, pp. 1-10.

"Cloud, Fog and Edge Computing—What's the Difference?", https://www.winsystems.com/cloud-fog-and-edge-computing-whats-the-difference/, Dec. 4, 2017, pp. 1-10.

"IoT: Understanding the shift from cloud to edge computing", https://internetofbusiness.com/shift-from-cloud-to-edge-computing/, Aug. 14, 2018, pp. 1-9.

Ai, Yuan, et al., "Edge computing technologies for Internet of Things: a primer", Digital Communications and Networks 4 | https://doi.org/10.1016/j.dcan.2017.07.001, 2018, pp. 77-86.

O'Keefe, Megan, "Edge Computing and the Cloud-Native Ecosystem", TheNewStack | https://thenewstack.io/edge-computing-and-the-cloud-native-ecosystem/, Apr. 18, 2018, pp. 1-11.

Ren, Ju, et al., "Edge Computing for the Internet of Things", IEEE Journals & Magazine | vol. 32 Issue: 1, 2008, pp. 1-6.

Zhao, Zhuoran, et al., "DeepThings: Distributed Adaptive Deep Learning Inference on Resource-Constrained IoT Edge Clusters", IEEE Transactions on Computer-Aided Design of Integrated Circuits and Systems, vol. 37, No. 11 | doi: 10.1109/TCAD.2018.2858384., Nov. 2018, pp. 2348-2359.

U.S. Appl. No. 18/185,300 titled "Scalable Centralized Manager Including Examples of Data Pipeline Deployment To an Edge System" filed Mar. 26, 2023.

(56) References Cited

OTHER PUBLICATIONS

Harnik, Danny, et al., "Secure Access Mechanism for Cloud Storage", vol. 12, No. 3, pp. 317-336. [Retrieved from internet on Feb. 14, 2023], <https://scpe.org/index.php/scpe/article/view/727>, 2011, pp. 317-336.

U.S. Appl. No. 18/321,678 titled "Generic Proxy Endpoints Using Protocol Tunnels Including Life Cyclemanagement and Examples for Distributed Cloud Native Services Andapplications" filed May 22, 2023.

Angelas, "Java Heap Space vs. Stack Memory: How Java Applications Allocate Memory", stackify.com, Sep. 5, 2017, pp. 1-3.

Beltre, Angel, et al., "Enabling HPC workloads on Cloud Infrastructure using Kubernetes Container Orchestration Mechanisms", 2019 IEEE/ACM Workshop on Containers and New Orchestration Paradigms for Isolated Environments in HPC (CANOPIEHPC), 2019, pp. 11-20.

Warke, Amit, et al., "Storage Service Orchestration with Container Elasticity", 2018 IEEE 4th International Conference on Collaboration and Internet Computing DOI 10.1109/CIC.2018.00046, 2018, pp. 283-292.

"Backup & Secure", USGS, 2018.

"Runtime System", Wikipedia, 2018.

U.S. Appl. No. 18/672,892 titled "Communication and Synchronization With Edge Systems" filed May 23, 2024.

Cascade Mode Deployment, https://docs.vmware.com/en/Unified-Access-Gateway/3.10/com.vmware.uag-310-deploy-config.doc/GUID-AWT-DEPLOYMENT-CASCADE.html#GUID-AWT-DEPLOYMENT-CASCADE, Jul. 2, 2019, pp. 2.

Mobile Content Management-Datasheet, https://www.vmware.com/content/dam/digitalmarketing/vmware/en/pdf/workspace-one/vmware-airwatch-mcm-datasheet.pdf, Mar. 12, 2019, pp. 4.

VMware Identity Manager API, https://developer.vmware.com/apis/57/#api ,Aug. 2018, pp. 2.

VMware Tunnel (Per-App VPN) Connections in Cascade Mode, https://docs.vmware.com/en/Unified-Access-Gateway/3.10/com.vmware.uag-310-deploy-config.doc/GUID-B69DD1E7-ED88-4574-912C-DBA071BC9D6F.html, May 31, 2019, pp. 2.

VMware Unified Access Gateway: Use Cases-Feature Walkthrough, https://www.youtube.com/watch?v=xaN9mYOJqAs, Oct. 27, 2017 ,pp. 1.

Workspace One Uem 1810 introduces support for Android Enterprise fully managed devices with work profiles, https://bayton.org/blog/2018/10/workspace-one-uem-1810-introduces-support-for-android-enterprise-fully-managed-devices-with-work-profiles/, Oct. 29, 2018, pp. 11.

Bayton, Jason et al., Android Enterprise COPE enrolment comparison: WS1 UEM / MI Core, https://www.youtube.com/watch?v=QSJu3xFzjMw, Oct. 28, 2018, pp. 1.

Poitras, Steven et al., The Nutanix Bible, https://nutanixbible.com/ ,Apr. 9, 2019, pp. all.

"Google IoT Platform: Awesome Tools for Any Project", https://indeema.com/blog/google-cloud, Feb. 20, 2019, pp. 1-9.

"Microsoft Azure IoT Reference Architecture", https://download.microsoft.com/download/A/4/D/A4DAD253-BC21-41D3-B9D9-87D2AE6F0719/Microsoft_Azure_IoT_Reference_Architecture.pdf, Sep. 26, 2018, pp. 18.

"Setup Azure IoT Edge CI/CD Pipeline with ARM Agent", https://devblogs.microsoft.com/iotdev/setup-azure-iot-edge-ci-cd-pipeline-with-arm-agent/, Nov. 13, 2018, pp. 1-11.

"The Developer's Guide to Azure", https://download.microsoft.com/download/2/C/F/2CF7401A-B9D7-4828-917D-199E0896BFE5/Azure_Developer_Guide_eBook.pdf, May 2019, pp. 64.

Asanghanwa, Eustace, "Simplifying confidential computing: Azure IoT Edge security with enclaves—Public preview", https://azure.microsoft.com/en-us/blog/simplifying-confidential-computing-azure-iot-edge-security-with-enclaves-public-preview/, Nov. 19, 2018, pp. 1-7.

Barr, Jeff, "AWS Greengrass—Run AWS Lambda Functions on Connected Devices", https://aws.amazon.com/blogs/aws/category/aws-greengrass/, Jun. 7, 2017, pp. 1-18.

Berdy, Nicole, "Azure IoT Hub message routing dramatically simplifies IoT solution development", https://azure.microsoft.com/en-us/blog/azure-iot-hub-message-routing-enhances-device-telemetry-and-optimizes-iot-infrastructure-resources/, Dec. 14, 2016.

DeCarlo, Paul, "Using Cognitive Services Containers with Azure IoT Edge", https://dev.to/azure/using-cognitive-services-containers-with-azure-iot-edge-1e5a, May 18, 2019, pp. 1-15.

Garcin-Beldowski, Sébastian, "AWS Greengrass the forefront of edge computing", https://medium.com/smileinnovation/aws-greengrass-the-forefront-of-edge-computing-8ec2098a33b7, Dec. 14, 2018, pp. 1-18.

George, Sam, "Azure IoT Edge generally available for enterprise-grade, scaled deployments", https://azure.microsoft.com/en-us/blog/azure-iot-edge-generally-available-for-enterprise-grade-scaled-deployments/, Jun. 27, 2018, pp. 1-5.

Lawton, George, "With AWS Greengrass, IoT apps become seamless edge to cloud", https://www.techtarget.com/iotagenda/feature/With-AWS-Greengrass-IoT-apps-become-seamless-edge-to-cloud, Jul. 16, 2018, pp. 1-7.

Liu, Gus, "How to Install a Face Recognition Model at the Edge with AWS IoT Greengrass", https://aws.amazon.com/blogs/iot/how-to-install-a-face-recognition-model-at-the-edge-with-aws-iot-greengrass/, Apr. 30, 2019, pp. 1-10.

Rai, Rahul, "Building Applications with Azure IoT Edge", https://thecloudblog.net/post/building-applications-with-azure-iot-edge/, Apr. 25, 2018, pp. 1-16.

Rai, Rahul, "IoT Edge Device Monitoring and Management with Azure Durable Entities Functions—Part 1", https://thecloudblog.net/post/iot-edge-device-monitoring-and-management-with-azure-durable-entities-functions-part-1/, Jul. 1, 2019, pp. 1-14.

\* cited by examiner

APPARATUSES AND METHODS FOR EDGE COMPUTING APPLICATION DEPLOYMENT

CROSS REFERENCE TO RELATED APPLICATION(S)

This application is a continuation of pending U.S. patent application Ser. No. 16/526,816 filed Jul. 30, 2019, which application claims priority to provisional application No. 62/870,146 filed Jul. 3, 2019. The aforementioned applications are incorporated herein by reference, in their entirety, for any purpose.

BACKGROUND

Internet of Things (IoT) systems are increasing in popularity. Generally, IoT systems utilize a number of edge devices. Edge devices may generally refer to computing systems deployed about an environment (which may be a wide geographic area in some examples). The edge devices may include computers, servers, clusters, sensors, appliances, vehicles, communication devices, etc. Edge devices may obtain data (including sensor data, voice data, image data, and/or video data, etc.). While edge devices may provide some processing of the data at the edge device, in some examples edge devices may be connected to a centralized analytics system (e.g., in a cloud or other hosted environment). The centralized analytics system, which may itself be implemented by one or more computing systems, may further process data received from edge devices by processing data received by individual edge devices and/or by processing combinations of data received from multiple edge devices.

Within an Internet of Things (IoT) computing environment, real-time data analytics computations at edge systems of an IoT system can be complex due to the distributed nature of edge system computing and diversity in methods and protocols for ingesting, processing, and communicating information back to a data cloud. That is, edge systems may be deployed over a wide geographic area, and diversity among the edge systems may make deployment of applications to retrieve and consume edge data across multiple edge systems of the IoT system difficult.

As the number of edge systems advantageously increases, it may become increasingly complicated to account for the disparate data types and acquisition methods employed by edge devices, the variety of analytical operations capable of being performed by the centralized analytics system, and/or the immense flow of data between the edge devices and the analytics system.

DETAILED DESCRIPTION

Figure 1:
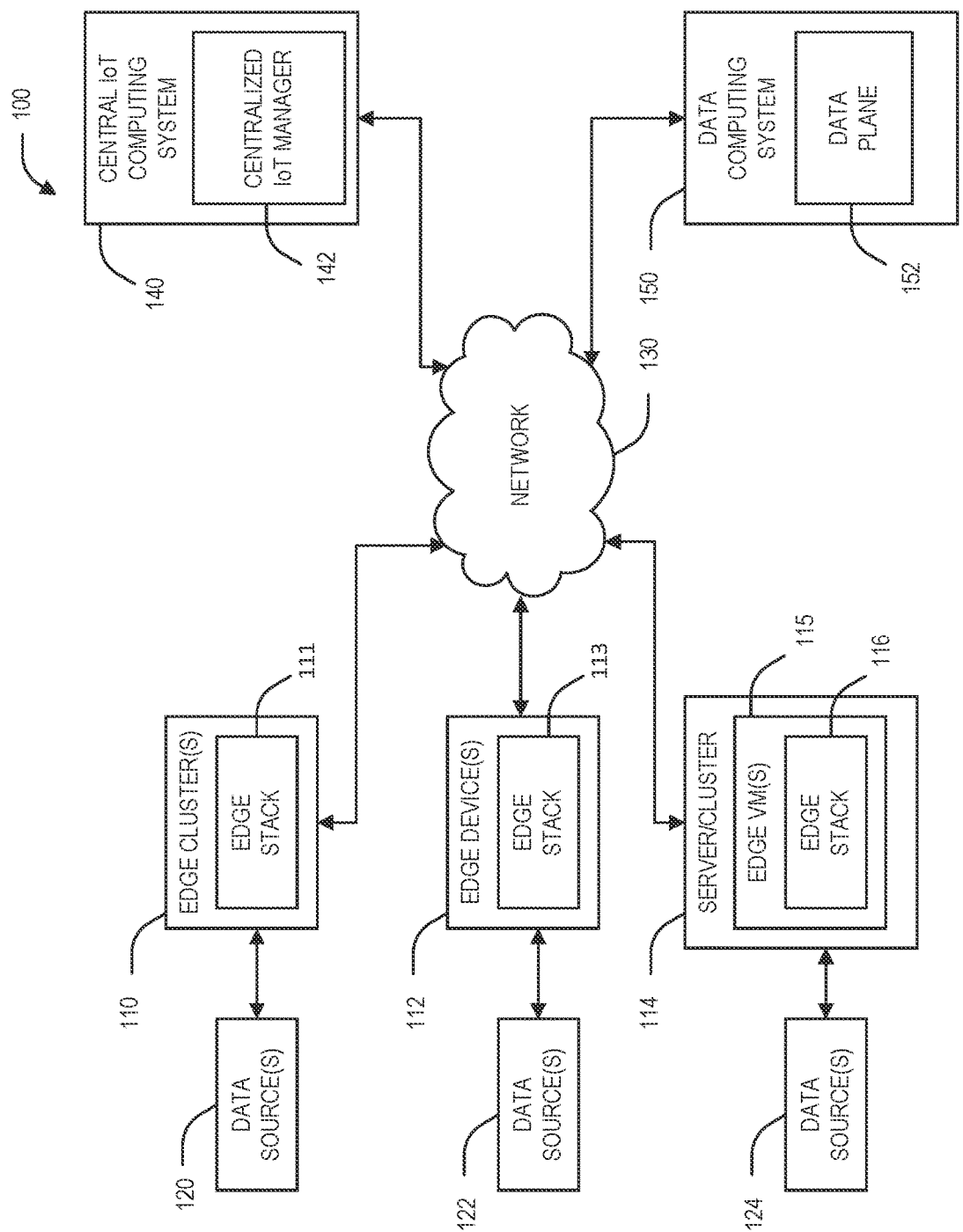
FIG. 1 is a block diagram of an Internet of Things system, in accordance with an embodiment of the present disclosure.

Examples described herein include a centralized Internet of Things (IoT) manager of an IoT system configured to manage deployment of data pipelines to edge systems for computing within an IoT system via a control plane. Data pipelines are applications that are constructed using a group of containers that each perform various functions within the data pipeline (e.g., subscriber, data processor, publisher, connectors that transform data for consumption by another container within the application, etc.) to transform or process input data to provide output data. Each data pipeline may be formed in a respective "sandbox" and include a group of containers that communicate with each other via a virtual intra-"sandbox" network (e.g., a pod). The centralized IoT manager may reside in the cloud (e.g., a remote computing system), and may selectively deploy or provide respective data pipelines to edge systems (e.g., or devices, sensors, computers, host machines, nodes, clusters, etc.) that are close to data sources (e.g., sensors, input devices, output devices, etc.) providing the source data that generates events relevant to the respective data pipeline. In response to receipt of a data pipeline, an edge system may be configured to determine whether to deploy the data pipeline for use based on whether relevant data sources and/or other relevant input data for the data pipeline are available to the edge system. In response to receipt of a request for a data pipeline related to a category or some other sensor attribute (e.g., all cameras facing a particular direction or on a particular floor), the centralized IoT manager may identify data sensors within the category and edge systems associated with the identified data sources, and may construct or build a data pipeline application (e.g., serverless code) to be deployed to the identified edge systems. Categories or attributes of sensors may include sensor type (e.g., video, audio, temperature, etc.) physical location, coverage area, etc.). A sensor may belong to more than one category or have more than one attribute. In some examples, the definition of stages of a constructed data pipeline application may be described using a user interface or representational state transfer (REST) API, with data ingestion and movement handled by connector or transform components built into the data pipeline.

In this manner, a large number of edge systems may readily be configured with only the necessary data pipelines. For example, individual edge systems may subscribe to or otherwise associate with specific categories. On connection to a centralized IoT manager, the centralized IoT manager can push serverless code to designated edge systems which may be specific to architecture of each edge system and establish only those data pipelines on a particular edge system that are needed to support the categories in use at the edge system. This may reduce the resources necessary at the edge system (e.g., the edge system need not support ALL data pipelines, and the edge system may nonetheless be automatically configured with serverless code).

Various embodiments of the present disclosure will be explained below in detail with reference to the accompanying drawings. The detailed description includes sufficient detail to enable those skilled in the art to practice the embodiments of the disclosure. Other embodiments may be utilized, and structural, logical and electrical changes may be made without departing from the scope of the present disclosure. The various embodiments disclosed herein are not necessary mutually exclusive, as some disclosed embodiments can be combined with one or more other disclosed embodiments to form new embodiments.

FIG. 1 is a block diagram of an Internet of Things (IoT) system 100, in accordance with an embodiment of the present disclosure. The IoT system 100 may include one or more of any of edge cluster(s) 110 coupled to respective data source(s) 120, edge device(s) 112 coupled to respective data source(s) 122, a server/cluster 114 coupled to respective data source(s) 124 and configured to host one or more edge virtual machines VM(s) 115. The IoT system 100 may further include a central IoT computing system 140 coupled to the one or more of the edge cluster(s) 110, the edge device(s) 112, and/or the edge VM(s) 115 hosted on the server/cluster 114 via a network 130 to manage configuration and operation of the IoT system 100. The IoT system 100 may further include a data computing system 150 coupled to the network 130 to configured to receive, store, process, etc., data received from the one or more of the edge cluster(s) 110, the edge device(s) 112, and/or the server/cluster 114 via a network 130.

The network 130 may include any type of network capable of routing data transmissions from one network device (e.g., the edge cluster(s) 110, the edge device(s) 112, the server/cluster 114, a computing node of the central IoT computing system 140, and/or a computing node of the data computing system 150) to another. For example, the network 130 may include a local area network (LAN), wide area network (WAN), intranet, or a combination thereof. The network 130 may include a wired network, a wireless network, or a combination thereof.

The IoT system 100 may include one or more types of edge systems selected from any combination of the edge cluster(s) 110, the edge device(s) 112, and/or the edge VM(s) 115 hosted on the server/cluster 114. Each of the edge cluster(s) (e.g., or tenants) 110 may include a respective cluster of edge nodes or devices that are configured to host a respective edge stack 111. The edge stack 111 may be distributed across multiple edge nodes, devices, or VMs of a respective one of the edge cluster(s) 110, in some examples. Each of the edge device(s) 112 may be configured to host a respective edge stack 113. Each of the edge VM(s) 115 may be configured to host a respective edge stack 116. In some examples, the server/cluster 114 may be included as part of the central IoT computing system 140 or the data computing system 150. For clarity, "edge system" may refer to any of the edge cluster(s) 110, the edge device(s) 112, and/or the edge VM(s) 115 hosted on the server/cluster 114. The edge stacks (e.g., any of the edge stack 111, the edge stack 113, and/or the edge stack 116) may include software configured to operate the respective edge system in communication between one or more of the respective data sources (e.g., the data source(s) 120, the data source(s) 122, and/or the data source(s) 124). The software may include instructions that are stored on a computer readable medium (e.g., memory, disks, etc. that is executable by one or more processor units (e.g., central processor units (CPUs), graphic processor units (GPUs), tensor processing units (TPUs), hardware accelerators, video processing units (VPUs), etc.) to perform functions, methods, etc., described herein.

The data source(s) 120, the data source(s) 122, and the data source(s) 124 ("data sources") may each include one or more devices configured to receive and/or generate respective source data. The data sources may include sensors (e.g., electrical, temperature, matter flow, movement, position, biometric data, or any other type of sensor), cameras, transducers, any type of RF receiver, or any other type of device configured to receive and/or generate source data.

Each of the edge stacks may include one or more data pipelines and/or applications. In some examples, some data pipelines and/or applications may be configured to receive and process/transform source data from one or more of the data sources. In some examples, two or more data pipelines may be concatenated together such that one data pipeline receives and processes/transforms data output from another data pipeline. In some examples, a data pipeline may span across multiple edge systems. Each of the one or more data pipelines and/or applications may be configured to process respective received data based on respective algorithms or functions to provide transformed data. In some examples, the respective algorithms or functions may include machine learning (ML) or artificial intelligence (AI) algorithms, or any other user-specified or defined function or algorithm.

The data pipelines can be constructed using computing primitives and building blocks, such as VMs, containers, processes, or any combination thereof. In some examples, the data pipelines may be constructed using a group of containers (e.g., a pod) that each perform various functions within the data pipeline (e.g., subscriber, data processor, publisher, connectors that transform data for consumption by another container within the application or pod, etc.) to consume, transform, and produce messages or data. In some examples, the definition of stages of a constructed data pipeline application may be described using a user interface or REST API, with data ingestion and movement handled by connector components built into the data pipeline. Thus, data may be passed between containers of a data pipeline using API calls. Constructing data pipelines using data primitives and building blocks may reduce downtime impact of deployment and updates as compared with hard-coding a data pipeline in an application without explicitly separating ingest, processing, and data movement.

In some examples, the edge systems may cause transformed data from a data pipeline or an application of the one or more data pipelines or applications of the edge stacks to be provided to a respective data plane as edge data, such as the data plane 152 of the data computing system 150, using respective data plane communication interfaces, including application programming interfaces (APIs). The data computing system 150 may be a dedicated computing system, or may include a centralized analytics system hosted on a network of remote servers that are configured to store, manage, and process data (e.g., cloud computing system).

The one or more data pipelines or applications of the edge stacks may be implemented using a containerized architecture that is managed via a container orchestrator. The data pipelines and/or applications communicate using application programming interface (API) calls, in some examples.

The centralized IoT manager 142 hosted on the central IoT computing system 140 may be configured to centrally manage configuration of each of the edge systems and data sources via a central control plane. The central IoT computing system 140 may include one or more computing nodes configured to host the centralized IoT manager 142. In some examples, the centralized IoT manager 142 may be distributed across a cluster of computing nodes of the central IoT computing system 140.

In some examples, the centralized IoT manager 142 may be configured to manage, for each of the edge systems, network configuration and security protocols, installed software (e.g., including data pipelines and applications), connected data source(s) (e.g., including type, category, identifiers, data communication protocols, etc.), connected data plane(s), communication between the edge systems and users, etc. The centralized IoT manager 142 may maintain configuration information for each of the edge systems, data sources, associated users, including hardware configuration information, installed software version information, connected data source information (e.g., including type, category, identifier, etc.), associated data planes, current operational status, authentication credentials and/or keys, etc.

The centralized IoT manager 142 may be configured to generate (e.g., build, construct, update, etc.) and distribute data pipelines and applications to selected edge systems based on the configuration maintained for each edge system. In some examples, the centralized IoT manager 142 may facilitate creation of one or more project constructs and may facilitate association of a respective one or more edge systems with a particular project construct (e.g., in response to user input and/or in response to criteria or metadata of the particular project). Each edge systems may be associated with no project constructs, one project construct, or more than one project construct. A project construct may be associated with any number of edge systems. When a data pipeline is created, the centralized IoT manager 142 may assign the data pipeline to or associate the data pipeline with a respective one or more project constructs. In response to the assignment to or association with the respective one or more project constructs, the centralized IoT manager 142 may deploy the data pipeline to each edge system associated with the respective one or more project constructs.

For example, in response to a request for a new data pipeline associated with a particular type or category of data sources and/or a project construct, the centralized IoT manager 142 may identify data sources having the particular type or category (e.g., or attribute), and/or may identify respective edge systems are connected to the identified data sources of the particular type or category and/or are associated with the particular project construct. For each identified edge system, the centralized IoT manager 142 may generate a respective version of the application or data pipeline based on respective hardware configuration information for the edge system. That is, the centralized IoT manager 142 may independently generate the applications and data pipelines to efficiently operate according to the specific hardware configuration of each edge system.

In response to receipt of a data pipeline, an edge system may be configured to determine whether to deploy the data pipeline for use based on whether relevant data sources and/or other relevant input data for the data pipeline are available to the edge system. Edge data may be provided from the edge systems to one or more respective data planes, such as the data plane 152 of the data cloud computing system 150, users, or other edge systems via the network 130. In some examples, the edge data may include some or all of the source data from one or more of the data sources, processed source data, data derived from the source data, combined source data, or any combination thereof. The data plane 152 may be configured to store the edge data, process the edge data, provide access to the edge data to clients, etc.

The data computing system 150 may include one or more cloud platforms that includes a plurality of computing nodes configured to host one or more versions of the data plane 152.

In operation, the IoT system 100 may include any number and combination of data sources selected from the data source(s) 120, the data source(s) 122, and the data source(s) 124 that are each configured to provide respective source data. The data sources of the IoT system 100 may collectively span any type of geographic area (e.g., across continents, countries, states, cities, counties, facilities, buildings, floors, rooms, systems, units, or any combination thereof). The number of data sources may range in the tens, hundreds, thousands, or more. The data sources may include sensors (e.g., electrical, temperature, matter flow, movement, position, biometric data, or any other type of sensor), cameras, transducers, any type of RF receiver, or any other type of device configured to receive and/or generate source data.

Rather than each of the data sources independently sending all source data directly to a data plane or user, the IoT system 100 may include any number and combination of edge systems selected from any combination of the edge cluster(s) 110, the edge device(s) 112, and/or the edge VM(s) 115 hosted on the server/cluster 114 that are proximately located with and connected to respective data sources and are each configured to receive and select/process/transform the source data that is provided to the data plane or user. The edge systems within the IoT system 100 may include homogenous hardware and software architectures, in some examples. In other examples, the edge systems have a wide array of hardware and software architecture and capabilities. Each of the edge systems may be connected to a respective subset of data sources, and may host respective data pipelines and applications (e.g., included in the edge stacks, such as the edge stack 111, edge stack 113, or edge stack 116) that are configured to process source data from a respective one or more of the connected data sources and/or transformed data from other applications and/or data pipelines.

Each of the one or more data pipelines and/or applications may be configured to process and/or distribute respective transformed data based on received source data (e.g., or other edge data) using respective algorithms or functions. In some examples, the respective algorithms or functions may include machine learning (ML) or artificial intelligence (AI) algorithms. In some examples, the algorithms or functions may include any other user-specified or defined function to process/transform/select/etc. received data. In some examples, an edge system may provide the transformed data from a data pipeline or an application of the one or more data pipelines or applications of the edge stacks to a respective destination data plane, such as the data plane 152 of the data computing system 150 as edge data. In some examples, the edge systems may be configured to share edge data with other edge systems. The one or more data pipelines or applications of the edge stacks may be implemented using a containerized architecture that is managed via a container orchestrator. The data pipelines and/or applications communicate using application programming interface (API) calls, in some examples.

The centralized IoT manager 142 hosted on the central IoT computing system 140 may be configured to centrally manage configuration of each of the edge systems and data sources. In some examples, the centralized IoT manager 142 may be configured to manage, for each of the edge systems, data sources, and/or users, network configuration and security protocols, installed software (e.g., including data pipelines and applications), connected data source(s) (e.g., including type, category, identifiers, data communication protocols, etc.), connected data plane(s), etc. The centralized IoT manager 142 may maintain configuration information for each of the edge systems, data sources, associated users, including hardware configuration information, installed software version information, connected data source information (e.g., including type, category, identifier, etc.), associated data planes, current operational status, authentication credentials and/or keys, etc.

The centralized IoT manager 142 may be configured to generate or update and distribute data pipelines and applications to selected edge systems based on the configuration maintained for each edge system. For example, in response to a request for a new data pipeline or application associated with a particular type or category of data sources, the centralized IoT manager 142 may identify data sources having the particular type or category, and identify respective edge systems are connected to the identified data sources of the particular type or category. For each identified edge system, the centralized IoT manager 142 may generate a respective version of the application or data pipeline based on respective hardware configuration information for the edge system. That is, the centralized IoT manager 142 may independently generate the applications and data pipelines to efficiently operate according to the specific hardware configuration of each edge system. The data pipelines may be constructed using a group of containers (e.g., a pod) each configured to perform various functions within the data pipeline (e.g., subscriber, data processor, publisher, connectors that transform data for consumption by another container within the application or pod, etc.). In some examples, the centralized IoT manager 142 may be configured to define stages of a constructed data pipeline application using a user interface or representational state transfer (REST) API, with data ingestion and movement handled by the connector components built into the data pipeline.

Thus, each data pipeline may include one or more of connector containers configured to pass data into the data pipeline (e.g., subscriber containers), pass data out from the data pipeline (e.g., publisher containers), or transform data for processing or output (e.g., transformation containers). For example, the transformation containers may be configured to transform data using a particular runtime environment (e.g., Python, Java, etc.) to apply a respective function or algorithm to received source data to provide the transformed data. The functions or algorithms may include any type of function or algorithm, such as video processing, video encoding, image processing, event detection, alerting, any other function or algorithm, or any combination thereof. Each of the data pipelines may further include processor containers that are configured to manage messaging between connector and transformation containers.

The edge systems may provide the edge data to one or more respective data planes, such as the data plane 152 of the data computing system 150, via the network 130. In some examples, the edge stacks may be configured to implement respective data plane communication interfaces, including application programming interfaces (APIs), to communicate with the one or more data planes. The data plane 152 may be configured to store the edge data, process the edge data, aggregate the edge data across the IoT system 100, provide access to the edge data to clients, or any combination thereof. The edge data received and processed at the data plane 152 may provide insight into events, trends, health, etc., of the IoT system 100 based in data captured by the data sources.

Figure 2:
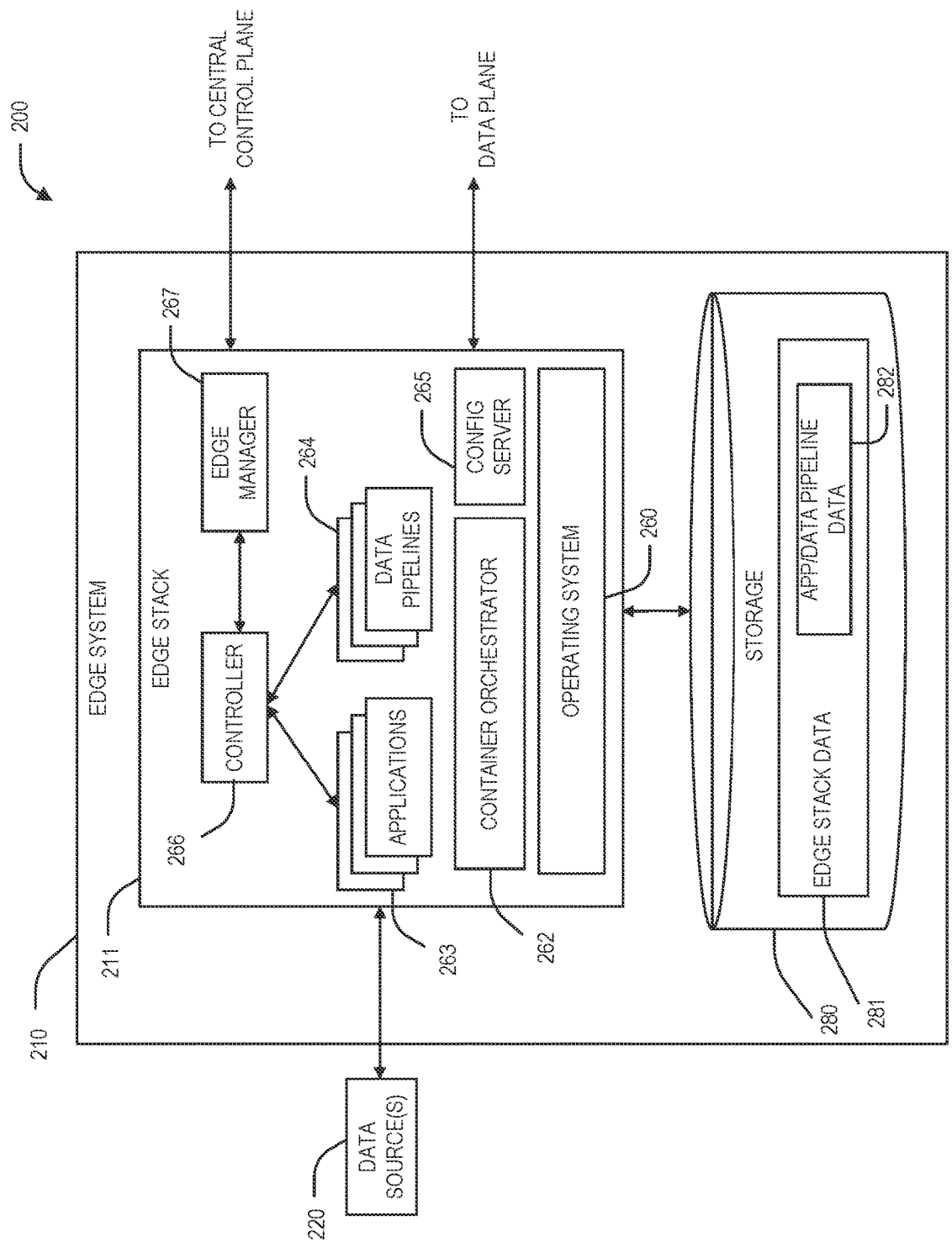
FIG. 2 is a block diagram of an edge computing system of an IoT system, in accordance with an embodiment of the present disclosure.

FIG. 2 is a block diagram of an edge computing system 200 of an IoT system, in accordance with an embodiment of the present disclosure. The edge computing system 200 may include an edge device/cluster/VM (edge system) 210 configured to host an edge stack 211 and storage 280. Any of the edge cluster(s) 110, the edge device(s) 112, and/or the edge VM(s) 115 of FIG. 1 may implement a respective version of the edge system 210. Any of the edge stack 111, the edge stack 113, and/or the edge stack 116 of FIG. 1 may implement some or all of the edge stack 211.

In some examples, the edge system 210 may include a respective cluster of computing nodes or devices that are configured to host a respective edge stack 211, with the edge stack 211 distributed across multiple computing nodes, devices, or VMs of the edge system 210. In some examples, the edge system 210 may be a single computing device configured to host the edge stack 211. In some examples, the edge system 210 may include a VM hosted on a server (e.g., or other host machine) that is configured to host the edge stack 211.

The storage 280 may be configured to store edge stack data 281, such as software images, binaries and libraries, metadata, etc., to be used by the edge system 210 to load and execute the edge stack. In some examples, the edge stack data 281 includes instructions that when executed by a process or the edge system 210, causes the edge system to perform functions described herein. The storage may include local storage (solid state drives (SSDs), hard disk drives (HDDs), flash or other non-volatile memory, volatile memory, or any combination thereof), cloud storage, networked storage, or any combination thereof.

The edge stack 211 includes a package hosted on a physical layer of the edge system 210 to facilitate communication with one or more data source(s) 220, other edge systems, a centralized IoT manager (e.g., the centralized IoT manager 142 of FIG. 1) via a control plane, and/or a data plane (e.g., the data plane 152 of FIG. 1). The data source(s) 220 may each include one or more devices configured to receive and/or generate respective source data. The data source(s) 220 may include sensors (e.g., electrical, temperature, matter flow, movement, position, biometric data, or any other type of sensor), cameras, transducers, any type of RF receiver, or any other type of device configured to receive and/or generate source data.

The edge stack 211 may host an underlying operating system 260 configured to interface the physical layer of the edge system 210. In some examples, a controller 266, an edge manager 267, a container orchestrator 262, and a configuration server 265 may run on the operating system 260. In some examples, the edge stack 211 may include a bare metal implementation that runs the operating system 260 directly on the physical layer. In other examples, the edge stack 211 may include a virtualized implementation with a hypervisor running on the physical layer and the operating system 260 running on the hypervisor.

The container orchestrator 262 may be configured to manage a containerized architecture of one or more applications 263 and/or one or more data pipelines 264. In some examples, the container orchestrator 262 may include Kubernetes® container orchestration software.

The edge manager 267 may communicate with the centralized IoT manager via the control plane to receive network configuration and communication information, data plane information, software packages for installation (e.g., including the applications 263 and the data pipelines 264), data source connectivity information, etc. In some examples, the edge manager 267 may also be configured to provide configuration and status information to the centralized IoT manager, including status information associated with one or more of the data source(s) 220.

In response to information received from the centralized IoT manager, the edge manager 267 may be configured to provide instructions to the controller 266 to manage the applications 263 and/or the data pipelines 264, which may include causing installation or upgrading of one of the applications 263 and/or the data pipelines 264, removing one of the applications 263 and/or the data pipelines 264, starting or stopping new instances of the applications 263 or the data pipelines 264, allocating hardware resources to each of the applications 263 and/or the data pipelines 264, or any combination thereof. The edge stack data 281 may include application and data pipeline data 282 that includes data specific to the respective applications 263 and/or the data pipelines 264 to facilitate execution.

As previously described, the applications 263 and the data pipelines 264 may be implemented using a containerized architecture to receive source data from one or more of the data source(s) 220 (e.g., or from others of the applications 263 and/or the data pipelines 264) and to provide respective transformed data at an output by applying a respective function or algorithm to the received source data. In some examples, the respective algorithms or functions may include machine learning (ML) or artificial intelligence (AI) algorithms or any other user-specified or defined function or algorithm. In some examples, the applications 263 and the data pipelines 264 may be constructed from other computing primitives and building blocks, such as VMs, processes, etc., or any combination of containers, VMs, processes, etc. The applications 263 and data pipelines 264 may each be formed in a respective "sandbox" and may include a group of containers that communicate with each other via a virtual intra-"sandbox" network (e.g., a pod).

In some examples, the data pipelines 264 may be constructed using a group of containers (e.g., a pod) that each perform various functions within the data pipeline 264 (e.g., subscriber, data processor, publisher, connectors that transform data for consumption by another container within the application or pod, etc.) In some examples, the definition of stages of a constructed data pipeline 264 application may be described using a user interface or REST API, with data ingestion and movement handled by connector components built into the data pipeline. Thus, data may be passed between containers of a data pipeline 264 using API calls.

In some examples, the applications 263 and/or the data pipelines 264 may cause the edge data to be provided to a respective destination data plane (e.g., such as the data plane 152 of FIG. 1) or to another edge device via the edge manager 267.

In some examples, the configuration server 265 may be configured to bootstrap the edge stack 211 for connection to a central control plane (e.g., to communicate with the centralized IoT manager) during initial deployment of the edge system 210.

In operation, the edge stack 211 hosted on the edge system 210 may control operation of the edge system 210 with an IoT system to facilitate communication with one or more data source(s) 220 and/or a data plane based on instructions provided from a centralized IoT manager via a control plane. The edge manager 267 of the edge stack 211 may communicate with the centralized IoT manager via the control plane to send configuration and/or status information (e.g., of the edge system 210 and/or one or more of the data source(s) 220) and/or to receive network configuration and communication information, data plane information, software packages for installation (e.g., including the applications 263 and the data pipelines 264), data source connectivity information, etc. In response to information received from the centralized IoT manager, the edge manager 267 may be configured to provide instructions to the controller 266 to manage the applications 263 and/or the data pipelines 264, which may include causing installation or upgrading of one of the applications 263 and/or the data pipelines 264, removing one of the applications 263 and/or the data pipelines 264, starting or stopping new instances of the applications 263 or the data pipelines 264, allocating hardware resources to each of the applications 263 and/or the data pipelines 264, storing data in and/or retrieving data from the edge stack data 281 and/or the application and data pipeline data 282 of the storage 280, or any combination thereof.

The applications 263 and the data pipelines 264 may receive source data from one or more of the data source(s) 220 (e.g., or from others of the applications 263 and/or the data pipelines 264) and to provide respective transformed data at an output by applying a respective function or algorithm to the received source data. In some examples, the respective algorithms or functions may include machine learning (ML) or artificial intelligence (AI) algorithms. In some examples, the applications 263 and/or the data pipelines 264 may cause the received and/or processed source data to be provided to a respective destination data plane (e.g., such as the data plane 152 of FIG. 1) via the configuration server 265. In some examples, the applications 263 and/or the data pipelines 264 may be implemented using a containerized architecture deployed and managed by the container orchestrator 262. Thus, the container orchestrator 262 may deploy, start, stop, and manage communication with the applications 263 and/or the data pipelines 264 within the edge stack 211.

The edge stack 211 may interface with one or more respective data planes (e.g., or other edge systems) to send data from and receive data at the edge system 210 using respective data plane communication interfaces, including APIs. Thus, the edge stack 211 may route transformed data from the applications 263 and/or the data pipelines 264 to a data plane (e.g., or another edge system) as edge data.

Figure 3:
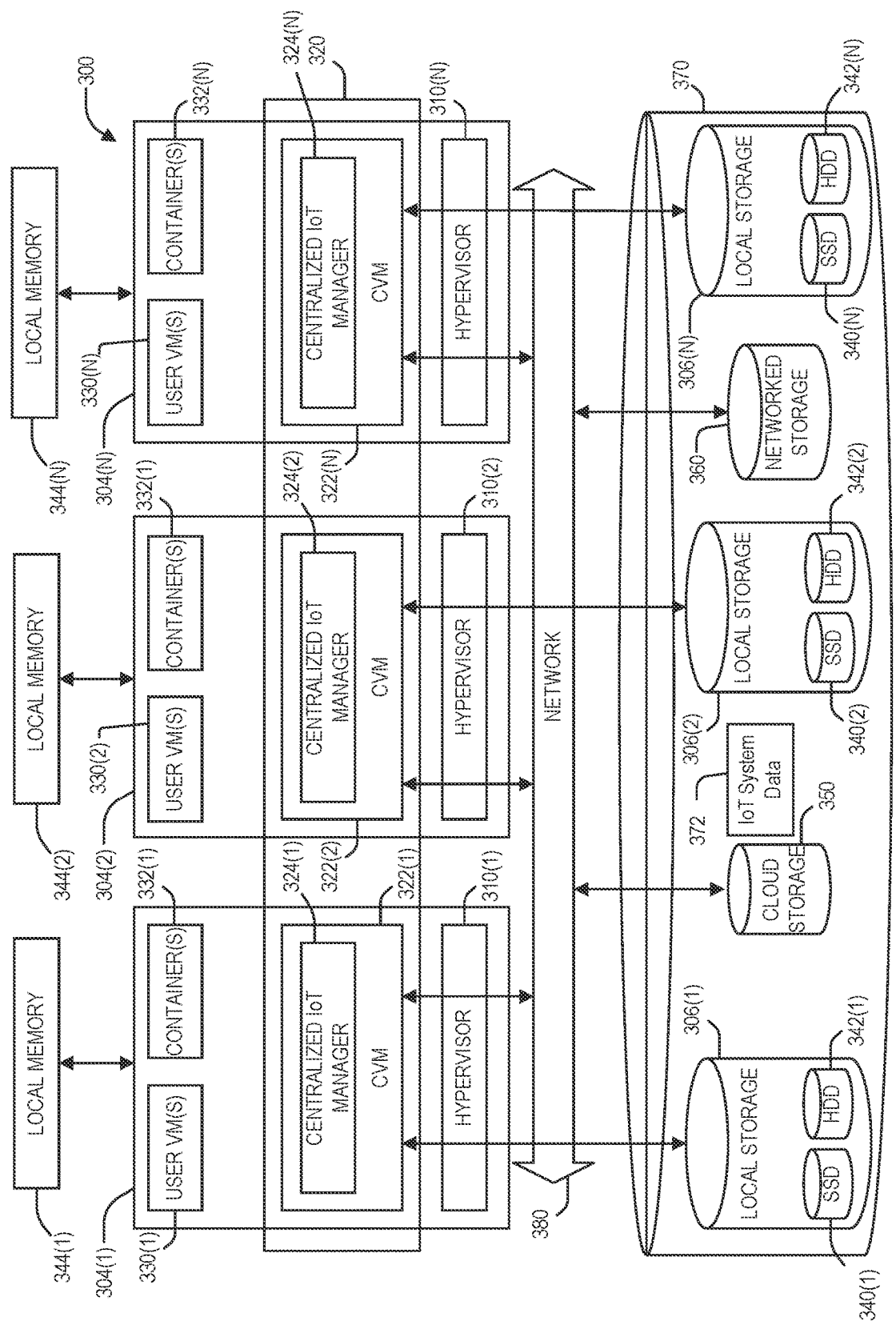
FIG. 3 is a block diagram of a distributed computing system, in accordance with an embodiment of the present disclosure.

FIG. 3 is a block diagram of a distributed computing system 300, in accordance with an embodiment of the present disclosure. The distributed computing system 300 generally includes computing nodes (e.g., host machines, servers, computers, nodes, etc.) 304(1)-(N) and storage 370 connected to a network 380. While FIG. 3 depicts three computing nodes, the distributed computing system 300 may include two or more than three computing nodes without departing from the scope of the disclosure. The network 380 may be any type of network capable of routing data transmissions from one network device (e.g., computing nodes 304(1)-(N) and the storage 370) to another. For example, the network 380 may be a local area network (LAN), wide area network (WAN), intranet, Internet, or any combination thereof. The network 380 may be a wired network, a wireless network, or a combination thereof. The central IoT computing system 140 of FIG. 1 may be configured to implement the distributed computing system 300, in some examples.

The storage 370 may include respective local storage 306(1)-(N), cloud storage 350, and networked storage 360. Each of the respective local storage 306(1)-(N) may include one or more solid state drive (SSD) devices 340(1)-(N) and one or more hard disk drives (HDD)) devices 342(1)-(N). Each of the respective local storage 306(1)-(N) may be directly coupled to, included in, and/or accessible by a respective one of the computing nodes 304(1)-(N) without communicating via the network 380. The cloud storage 350 may include one or more storage servers that may be stored remotely to the computing nodes 304(1)-(N) and may be accessed via the network 380. The cloud storage 350 may generally include any type of storage device, such as HDDs, SSDs, optical drives, etc. The networked storage (or network-accessed storage) 360 may include one or more storage devices coupled to and accessed via the network 380. The networked storage 360 may generally include any type of storage device, such as HDDs, SSDs, optical drives, etc. In various embodiments, the networked storage 360 may be a storage area network (SAN).

Each of the computing nodes 304(1)-(N) may include a computing device configured to host a respective hypervisor 310(1)-(N), a respective controller virtual machine (CVM) 322(1)-(N), respective user (or guest) virtual machines (VMs) 330(1)-(N), and respective containers 332(1)-(N). For example, each of the computing nodes 304(1)-(N) may be or include a server computer, a laptop computer, a desktop computer, a tablet computer, a smart phone, any other type of computing device, or any combination thereof. Each of the computing nodes 304(1)-(N) may include one or more physical computing components, such as one or more processor units, respective local memory 344(1)-(N) (e.g., cache memory, dynamic random-access memory (DRAM), non-volatile memory (e.g., flash memory), or combinations thereof), the respective local storage 306(1)-(N), ports (not shown) to connect to peripheral input/output (I/O) devices (e.g., touchscreens, displays, speakers, keyboards, mice, cameras, microphones, environmental sensors, etc.).

Each of the user VMs 330(1)-(N) hosted on the respective computing node includes at least one application and everything the user VM needs to execute (e.g., run) the at least one application (e.g., system binaries, libraries, etc.). Each of the user VMs 330(1)-(N) may generally be configured to execute any type and/or number of applications, such as those requested, specified, or desired by a user. Each of the user VMs 330(1)-(N) further includes a respective virtualized hardware stack (e.g., virtualized network adaptors, virtual local storage, virtual memory, processor units, etc.). To manage the respective virtualized hardware stack, each of the user VMs 330(1)-(N) is further configured to host a respective operating system (e.g., Windows®, Linux®, etc.). The respective virtualized hardware stack configured for each of the user VMs 330(1)-(N) may be defined based on available physical resources (e.g., processor units, the local memory 344(1)-(N), the local storage 306(1)-(N), etc.). That is, physical resources associated with a computing node may be divided between (e.g., shared among) components hosted on the computing node (e.g., the hypervisor 310(1)-(N), the CVM 322(1)-(N), other user VMs 330(1)-(N), the containers 332(1)-(N), etc.), and the respective virtualized hardware stack configured for each of the user VMs 330(1)-(N) may reflect the physical resources being allocated to the user VM. Thus, the user VMs 330(1)-(N) may isolate an execution environment my packaging both the user space (e.g., application(s), system binaries and libraries, etc.) and the kernel and/or hardware (e.g., managed by an operating system). While FIG. 3 depicts the computing nodes 304(1)-(N) each having multiple user VMs 330(1)-(N), a given computing node may host no user VMs or may host any number of user VMs.

Rather than providing hardware virtualization like the user VMs 330(1)-(N), the respective containers 332(1)-N) may each provide operating system level virtualization. Thus, each of the respective containers 332(1)-(N) is configured to isolate the user space execution environment (e.g., at least one application and everything the container needs to execute (e.g., run) the at least one application (e.g., system binaries, libraries, etc.)) without requiring a hypervisor to manage hardware. Individual ones of the containers 332(1)-(N) may generally be provided to execute any type and/or number of applications, such as those requested, specified, or desired by a user. Two or more of the respective containers 332(1)-(N) may run on a shared operating system, such as an operating system of any of the hypervisor 310(1)-(N), the CVM 322(1)-(N), or other user VMs 330(1)-(N). In some examples, an interface engine may be installed to communicate between a container and an underlying operating system. While FIG. 3 depicts the computing nodes 304(1)-(N) each having multiple containers 332(1)-(N), a given computing node may host no containers or may host any number of containers.

Each of the hypervisors 310(1)-(N) may include any type of hypervisor. For example, each of the hypervisors 310(1)-(N) may include an ESX, an ESX(i), a Hyper-V, a KVM, or any other type of hypervisor. Each of the hypervisors 310(1)-(N) may manage the allocation of physical resources (e.g., physical processor units, volatile memory, the storage 370) to respective hosted components (e.g., CVMs 322(1)-(N), respective user VMs 330(1)-(N), respective containers 332(1)-(N)) and performs various VM related operations, such as creating new VMs, cloning existing VMs, etc. Each type of hypervisor may have a hypervisor-specific API through which commands to perform various operations may be communicated to the particular type of hypervisor. The commands may be formatted in a manner specified by the hypervisor-specific API for that type of hypervisor. For example, commands may utilize a syntax and/or attributes specified by the hypervisor-specific API. Collectively, the hypervisors 310(1)-(N) may all include a common hypervisor type, may all include different hypervisor types, or may include any combination of common and different hypervisor types.

The CVMs 322(1)-(N) may provide services the respective user VMs 330(1)-(N), and/or the respective containers 332(1)-(N) hosted on a respective computing node of the computing nodes 304(1)-(N). For example, each of the CVMs 322(1)-(N) may execute a variety of software and/or may serve the I/O operations for the respective hypervisor 310(1)-(N), the respective user VMs 330(1)-(N), and/or the respective containers 332(1)-(N) hosted on the respective computing node 304(1)-(N). The CVMs 322(1)-(N) may communicate with one another via the network 380. By linking the CVMs 322(1)-(N) together via the network 380, a distributed network (e.g., cluster, system, etc.) of the computing nodes 304(1)-(N) may be formed. In an example, the CVMs 322(1)-(N) linked together via the network 380 may form a distributed computing environment (e.g., a distributed virtualized file server) 320 configured to manage and virtualize the storage 370. In some examples, a SCSI controller, which may manage the SSD devices 340(1)-(N) and/or the HDD devices 342(1)-(N) described herein, may be directly passed to the respective CVMs 322(1)-(N), such as by leveraging a VM-Direct Path. In the case of Hyper-V, the SSD devices 340(1)-(N) and/or the HDD devices 342 (1)-(N) may be passed through to the respective CVMs 322(1)-(N).

The CVMs 322(1)-(N) may coordinate execution of respective services over the network 380, and the services running on the CVMs 322(1)-(N) may utilize the local memory 344(1)-(N) to support operations. The local memory 344(1)-(N) may be shared by components hosted on the respective computing node 304(1)-(N), and use of the respective local memory 344(1)-(N) may be controlled by the respective hypervisor 310(1)-(N). Moreover, multiple instances of the same service may be running throughout the distributed system 300. That is, the same services stack may be operating on more than one of the CVMs 322(1)-(N). For example, a first instance of a service may be running on the CVM 322(1), a second instance of the service may be running on the CVM 322(2), etc.

In some examples, the CVMs 322(1)-(N) may be configured to collectively manage a centralized IoT manager of an IoT system, with each of the CVMs 322(1)-(N) hosting a respective centralized IoT manager instances 324(1)-(N) on an associated operating system to form the centralized IoT manager. In some examples, one of the centralized IoT manager instances 324(1)-(N) may be designated as a master centralized IoT manager instance configured to coordinate collective operation of the centralized IoT manager instances 324(1)-(N). The centralized IoT manager instances 324(1)-(N) may be configured to manage configuration of (e.g., network connectivity information, connected data sources, installed application and other software versions, data pipelines, etc.), as well as generate and distribute data pipelines to edge systems (e.g., any of an edge device of the edge cluster(s) 110, the edge device(s) 112, the edge VM(s) 115 of the server/cluster 114, etc.) of an IoT system centrally manage operation of the IoT system. The centralized IoT manager instances 324(1)-(N) may be configured to interface with multiple edge system types and interfaces via a control plane. To manage the operation of the IoT system, the centralized IoT manager instances 324(1)-(N) may retrieve data from and store data to IoT system data 372 of the storage 370. The IoT system data 372 may include metadata and other data corresponding to each edge system, data source, user, site, etc. within the IoT system. For example, the IoT system data 372 may include hardware configurations, software configurations, network configurations, edge system and/or data source type, categories, geographical and physical locations, authentication information, associations between edge systems and data sources, associations between edge systems and users, user access permissions, etc., or any combination thereof.

Generally, the CVMs 322(1)-(N) may be configured to control and manage any type of storage device of the storage 370. The CVMs 322(1)-(N) may implement storage controller logic and may virtualize all storage hardware of the storage 370 as one global resource pool to provide reliability, availability, and performance. IP-based requests may be generally used (e.g., by the user VMs 330(1)-(N) and/or the containers 332(1)-(N)) to send I/O requests to the CVMs 322(1)-(N). For example, the user VMs 330(1) and/or the containers 332(1) may send storage requests to the CVM 322(1) using an IP request, the user VMs 330(2) and/or the containers 332(2) may send storage requests to the CVM 322(2) using an IP request, etc. The CVMs 322(1)-(N) may directly implement storage and I/O optimizations within the direct data access path.

Note that the CVMs 322(1)-(N) provided as virtual machines utilizing the hypervisors 310(1)-(N). Since the CVMs 322(1)-(N) run "above" the hypervisors 310(1)-(N), some of the examples described herein may be implemented within any virtual machine architecture, since the CVMs 322(1)-(N) may be used in conjunction with generally any type of hypervisor from any virtualization vendor.

Virtual disks (vDisks) may be structured from the storage devices in the storage 370. A vDisk generally refers to the storage abstraction that may be exposed by the CVMs 322(1)-(N) to be used by the user VMs 330(1)-(N) and/or the containers 332(1)-(N). Generally, the distributed computing system 300 may utilize an IP-based protocol, such as an Internet small computer system interface (iSCSI) or a network file system interface (NFS), to communicate between the user VMs 330(1)-(N), the containers 332(1)-(N), the CVMs 322(1)-(N), and/or the hypervisors 310(1)-(N). Thus, in some examples, the vDisk may be exposed via an iSCSI or a NFS interface, and may be mounted as a virtual disk on the user VMs 330(1)-(N) and/or operating systems supporting the containers 332(1)-(N). iSCSI may generally refer to an IP-based storage networking standard for linking data storage facilities together. By carrying SCSI commands over IP networks, iSCSI can be used to facilitate data transfers over intranets and to manage storage over any suitable type of network or the Internet. The iSCSI protocol may allow iSCSI initiators to send SCSI commands to iSCSI targets at remote locations over a network. NFS may refer to an IP-based file access standard in which NFS clients send file-based requests to NFS servers via a proxy folder (directory) called "mount point".

During operation, the user VMs 330(1)-(N) and/or operating systems supporting the containers 332(1)-(N) may provide storage input/output (I/O) requests to the CVMs 322(1)-(N) and/or the hypervisors 310(1)-(N) via iSCSI and/or NFS requests. Each of the storage I/O requests may designate an IP address for a CVM of the CVMs 322(1)-(N) from which the respective user VM desires I/O services. The storage I/O requests may be provided from the user VMs 330(1)-(N) to a virtual switch within a hypervisor of the hypervisors 310(1)-(N) to be routed to the correct destination. For examples, the user 330(1) may provide a storage request to the hypervisor 310(1). The storage I/O request may request I/O services from a CVM of the CVMs 322 (1)-(N). If the storage I/O request is intended to be handled by a respective CVM of the CVMs 322(1)-(N) hosted on a same respective computing node of the computing nodes 304(1)-(N) as the requesting user VM (e.g., CVM 322(1) and the user VM 330(1) are hosted on the same computing node 304(1)), then the storage I/O request may be internally routed within the respective computing node of the computing node of the computing nodes 304(1)-(N). In some examples, the storage I/O request may be directed to respective CVM of the CVMs 322(1)-(N) on another computing node of the computing nodes 304(1)-(N) as the requesting user VM (e.g., CVM 322(1) is hosted on the computing node 304(1) and the user VM 330(2) is hosted on the computing node 304(2)). Accordingly, a respective hypervisor of the hypervisors 310(1)-(N) may provide the storage request to a physical switch to be sent over the network 380 to another computing node of the computing nodes 304(1)-(N) hosting the requested CVM of the CVMs 322(1)-(N).

The CVMs 322(1)-(N) may collectively manage the storage I/O requests between the user VMs 330(1)-(N) and/or the containers 332(1)-(N) of the distributed computing system and a storage pool that includes the storage 370. That is, the CVMs 322(1)-(N) may virtualize I/O access to hardware resources within the storage pool. In this manner, a separate and dedicated CVM of the CVMs 322(1)-(N) may be provided each of the computing nodes 304(1)-(N) the distributed computing system 300. When a new computing node is added to the distributed computing system 300, it may include a respective CVM to share in the overall workload of the distributed computing system 300 to handle storage tasks. Therefore, examples described herein may be advantageously scalable, and may provide advantages over approaches that have a limited number of controllers. Consequently, examples described herein may provide a massively-parallel storage architecture that scales as and when computing nodes are added to the system.

The distributed system 300 may include a centralized IOT manager that includes one or more of the centralized IoT manager instances 324(1)-(N) hosted on the CVMs 322(1)-(N). The centralized IoT manager may be configured to centrally manage configuration of edge systems and data sources of the corresponding IoT system. In some examples, the centralized IoT manager may be configured to manage, for each of the edge systems, data sources, and/or users, network configuration and security protocols, installed software (e.g., including data pipelines and applications), connected data source(s) (e.g., including type, category, identifiers, data communication protocols, etc.), connected data plane(s), etc. The centralized IoT manager may maintain configuration information for each of the edge systems, data sources, associated users, including hardware configuration information, installed software version information, connected data source information (e.g., including type, category, identifier, etc.), associated data planes, current operational status, authentication credentials and/or keys, etc.

In some examples, a workload of the centralized IoT manager may be distributed across two or more of the computing nodes 304(1)-(N) via the respective centralized IoT manager instances 324(1)-(N). In other examples, the workload of the centralized IoT manager may reside in a single one of the centralized IoT manager instances 324(1)-(N). A number of centralized IoT manager instances 324(1)-(N) running on the distributed computing system 300 may depend on a size of the management workload associated with the IoT system (e.g., based on a number of edge systems, data sources, users, etc., level of activity within the IoT system, frequency of updates, etc.), as well as compute resources available on each of the computing nodes 304(1)-(N). One of the centralized IoT manager instances 324(1)-(N) may be designated a master centralized server manager that is configured to monitor workload of the centralized IoT manager instances 324(1)-(N), and based on the monitored workload, allocate management of respective edge systems and users to each of the centralized IoT manager instances 324(1)-(N) and start additional centralized IoT manager instances when compute resources available to the centralized IoT manager have fallen below a defined threshold. Thus, while FIG. 3 depicts each of the CVMs 322(1)-(N) hosting a respective one of the centralized IoT manager instances 324(1)-(N), it is appreciated that some of the CVMs 322(1)-(N) may not have an active centralized IoT manager instances 324(1)-(N) running without departing from the scope of the disclosure.

In some examples, the centralized IoT manager may be configured to generate or update and distribute data pipelines and applications to selected edge systems based on the configuration maintained for each edge system. In some examples, the centralized IoT manager may facilitate creation of one or more project constructs and may facilitate association of a respective one or more edge systems with a particular project construct (e.g., in response to user input and/or in response to criteria or metadata of the particular project). Each edge systems may be associated with no project constructs, one project construct, or more than one project construct. A project construct may be associated with any number of edge systems. When a data pipeline is created, the centralized IoT manager may assign the data pipeline to or associate the data pipeline with a respective one or more project constructs. In response to the assignment to or association with the respective one or more project constructs, the centralized IoT manager 142 may deploy the data pipeline to each edge system associated with the respective one or more project constructs.

For example, in response to a request for a new data pipeline or application associated with a particular type or category of data sources and/or a project construct, the centralized IoT manager may identify data sources having the particular type or category (e.g., or attribute, and/or may identify respective edge systems are connected to the identified data sources of the particular type or category and/or are associated with the particular project construct. For each identified edge system, the centralized IoT manager may generate a respective version of the application or data pipeline based on respective hardware configuration information for the edge system. That is, the centralized IoT manager may independently generate the applications and data pipelines to efficiently operate according to the specific hardware configuration of each edge system.

Each data pipeline may be formed in a respective "sandbox" and include a group of containers that communicate with each other via a virtual intra-"sandbox" network (e.g., a pod). Thus, each data pipeline may include one or more of connector containers configured to pass data into the data pipeline (e.g., subscriber containers), pass data out from the data pipeline (e.g., publisher containers), or transform data for processing or output (e.g., transformation containers). For example, the transformation containers may be configured to transform data using a particular runtime environment (e.g., Python, Java, etc.) to apply a respective function or algorithm to received source data to provide the transformed data. The functions or algorithms may include any type of function or algorithm, such as video processing, video encoding, image processing, event detection, alerting, any other function or algorithm, or any combination thereof. Each of the data pipelines may further include processor containers that are configured to manage messaging between connector and transformation containers.

Once constructed, the centralized IoT manager may deploy the data pipeline to one or more respective edge systems via a secure connection. Constructing data pipelines using data primitives and building blocks may reduce downtime impact of deployment and updates as compared with hard-coding a data pipeline in an application without explicitly separating ingest, processing, and data movement. And deploying the data pipelines on an "as-needed" basis to each edge system may reduce wasted compute resource consumption at the edge systems and limit network traffic and downtime when updates are implemented.

Figure 4:
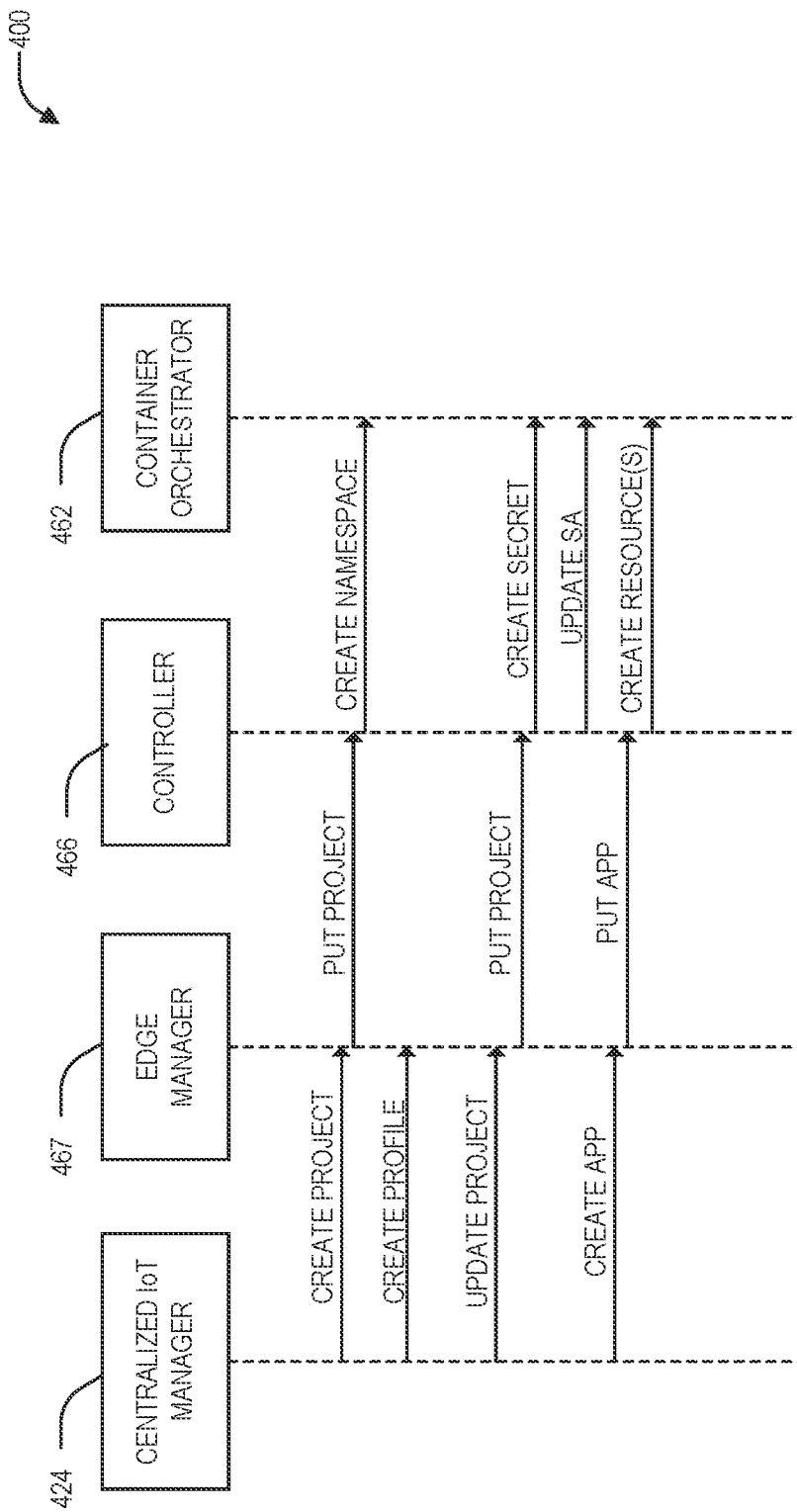
FIG. 4 is a sequence diagram to deploy a data pipeline, in accordance with an embodiment of the present disclosure.

FIG. 4 is a sequence diagram 400 to deploy a data pipeline, in accordance with an embodiment of the present disclosure. The sequence diagram of FIG. 4 may be performed via the IoT system of FIG. 1. The centralized IoT manager 424 may instruct an edge system hosting an edge stack that includes an edge manager 467, a controller 466, and a container orchestrator 462 to create a project and load an application or data pipeline into the project. The centralized IoT manager 142 of FIG. 1 and/or one or more of the centralized IoT manager instances 324(1)-(N) may implement the centralized IoT manager 424. Any of the edge stacks 111, 113, and/or 116 of FIG. 1 and/or the edge manager 267 of FIG. 2 may implement the edge manager 467. Any of the edge stacks 111, 113, and/or 116 of FIG. 1 and/or the controller 266 of FIG. 2 may implement the controller 466. Any of the edge stacks 111, 113, and/or 116 of FIG. 1 and/or the container orchestrator 262 of FIG. 2 may implement the container orchestrator 462.

The centralized IoT manager 424 may send a CREATE PROJECT message to the edge manager 467 to instruct the edge manager 467 to create a project on the corresponding edge system. A project may be used to define a group of applications or data pipelines for a particular purpose. In response, the edge manager 467 may send a PUT PROJECT message to the controller 466 to instruct creation of the project. In response, the controller 466 may send a CREATE NAMESPACE message to the container orchestrator 462 to instruct the container orchestrator 462 to create a space for the project. The space for the project may server to communicatively isolate data pipelines within a project from data pipelines and containers outside the project.

The centralized IoT manager 424 may send a CREATE PROFILE message to the edge manager 467 to instruct the edge manager 467 to create a security profile for transferring data across the network. Subsequently, the centralized IoT manager 424 may send an UPDATE PROJECT message to the edge manager 467 to instruct the edge manager 467 to update the project to include a security profile for transferring data across the network. In response, the edge manager 467 may send a PUT PROJECT message to the controller 466 to instruct creation of a secret. In response, the controller 466 may send a CREATE SECRET message to the container orchestrator 462 to instruct the container orchestrator 462 to create a secret (e.g., a key or other authentication code). Subsequently, the controller 466 may send an UPDATE SA (secure authorization) message to the container orchestrator 462 to instruct the container orchestrator 462 to create a secret (e.g., a key or other authentication code).

The centralized IoT manager 424 may send a CREATE APP message to the edge manager 467 to instruct the edge manager 467 to create an application or data pipeline on the corresponding edge system. In response, the edge manager 467 may send a PUT APP message to the controller 466 to instruct the controller 466 to create the application or data pipeline. In response, the controller 466 may send a CREATE RESOURCE(S) message to the container orchestrator 462 to instruct the container orchestrator 462 to create the resources necessary to host the application or data pipeline.

Figure 5:
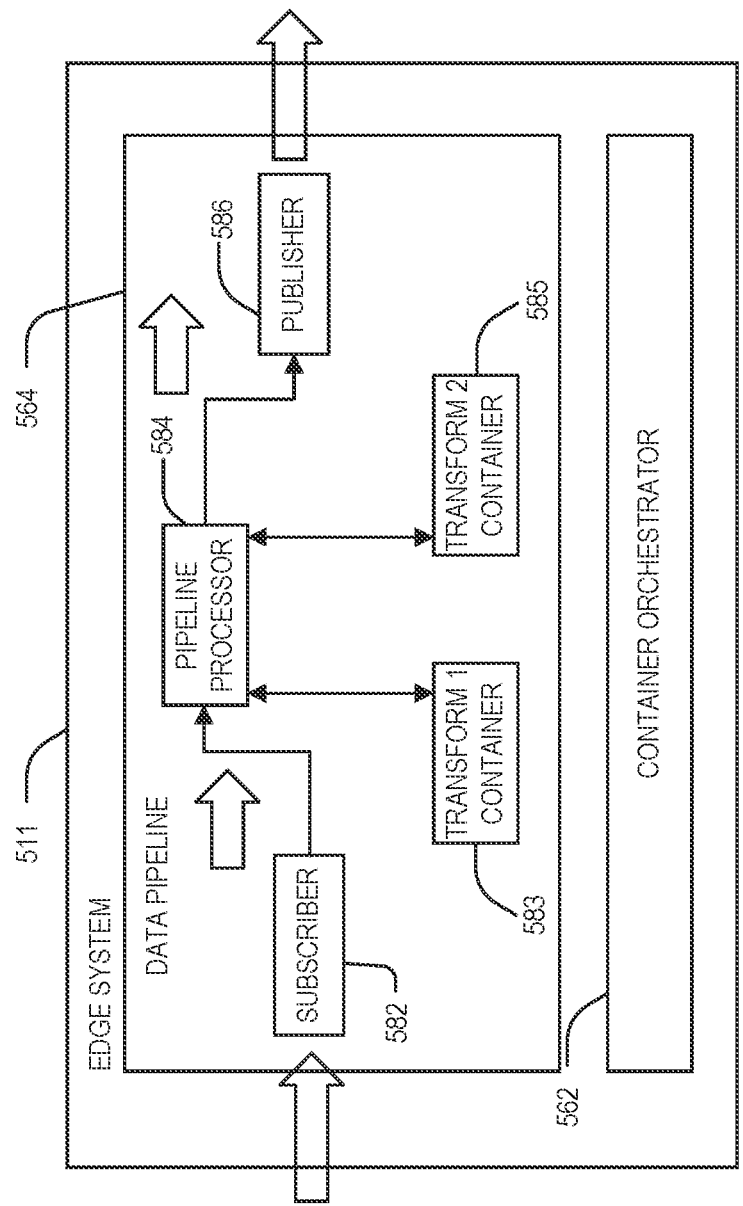
FIG. 5 is a block diagram of an edge computing device with an edge stack that includes a data pipeline, in accordance with an embodiment of the present disclosure.

FIG. 5 is a block diagram of an edge system 500 hosting an edge stack 511 having a data pipeline 564, in accordance with an embodiment of the present disclosure. Any of the edge cluster(s) 110, the edge device(s) 112, or the server/cluster 114 of FIG. 1, the edge computing system 200 of FIG. 2, an edge system configured host the edge manager 467, the controller 466, or the container orchestrator 462 of FIG. 4 may implement the edge system 500.

The edge stack 511 may host the data pipeline 564 that is managed by a container orchestrator 562. The data pipeline 564 may include a series of components that are configured to pass a message from one component to the next such that it includes a chronologically ordered stream of messages. The data pipeline 564 may be configured to receive to input data, such as source data (e.g., from one of the data source(s) 120, 122 or 124 of FIG. 1 and/or the data source(s) 220 of FIG. 2) or data from another data pipeline.

The data pipeline 564 can be constructed using computing primitives and building blocks, such as VMs, containers, processes, or any combination thereof. In some examples, the stages of the data pipeline 564 may be described using a user interface or REST API, with data ingestion and movement handled by connector components built into the data pipeline 564. Thus, data may be passed between containers of a data pipeline using API calls. As depicted in FIG. 5, the data pipeline 564 may include a group of containers to form a pod that includes a subscriber 582, a first transformation container 583, a pipeline processor 584, a second transformation container 585, and a publisher 586 each configured to perform various functions within the data pipeline 564 to consume, transform, and produce messages or data.

For example, the pipeline processor 584 may be configured to manage messaging between the subscriber 582, the first transformation container 583, the second transformation container 585, and the publisher 586. In some examples, the subscriber 582, the first transformation container 583, the second transformation container 585, and the publisher 586 may all provide acknowledge messages back to the pipeline processor 584 in response to receipt of messages. Thus, the second transformation container 585 may act as a message broker within the data pipeline 564.

The subscriber 582 is configured to receive messages of a certain topic from a message system and to provide the received message to the pipeline processor 584. The message may include source data or data from another data pipeline.

The first transformation container 583 may be configured to receive messages from the pipeline processor 584 (e.g. provided by the subscriber 582 and/or the second transformation container 585) and is configured to transform the message data using a first runtime environment (e.g., Python, Java, etc.) to apply a respective function or algorithm to received source data to provide the transformed data. The first transformation container 583 is further configured to provide the transformed data in a message back to the pipeline processor 584. Similar to the first transformation container 583, the second transformation container 585 may be configured to receive messages from the pipeline processor 584 (e.g. provided by the subscriber 582 and/or the second transformation container 585) and is configured to transform the message data using a second runtime environment (e.g., Python, Java, etc.) to apply a respective function or algorithm to received source data to provide the transformed data. The second transformation container 585 is further configured to provide the transformed data in a message back to the pipeline processor 584. In some examples, the first transformation container 583 and the second transformation container 585 may be configured to apply common functions or algorithms in different runtime environments. In other examples, the first transformation container 583 and the second transformation container 585 may be configured to apply a different functions or algorithms in the different runtime environments. The functions or algorithms may include any type of function or algorithm, such as video processing, video encoding, image processing, event detection, alerting, any other function or algorithm, or any combination thereof. Each of the data pipelines may further include processor containers that are configured to manage messaging between connector and transformation containers.). More or fewer than two transformation containers may be included in the data pipeline 564 without departing from the scope of the disclosure.

The publisher 586 is configured to receive messages from the pipeline processor 584 and is configured to publish the messages to a certain topic of a message system, to local data services, and/or to a data plane (e.g., to a remote or cloud computing system). The topic may be subscribed to by other data pipelines to further process the data and/or a configuration server to provide the output data to a data plane.

Figure 6:
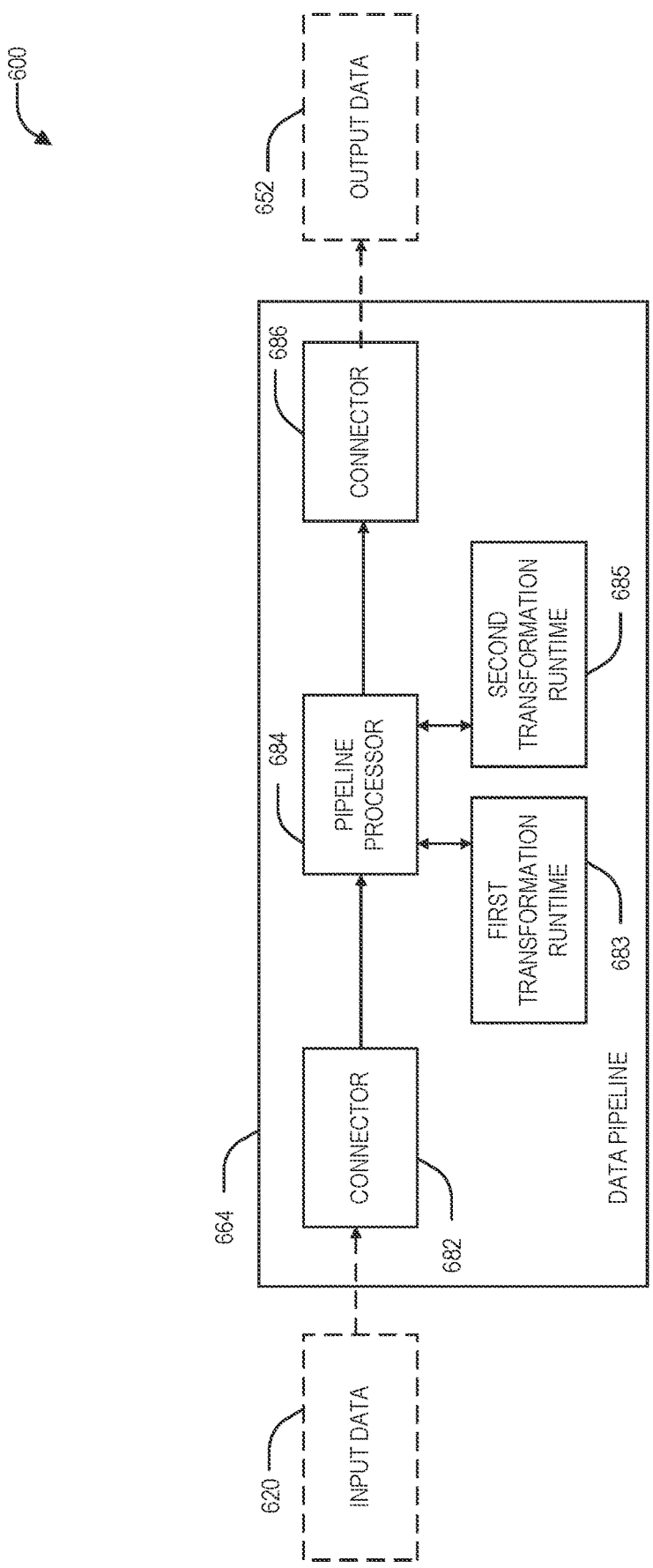
FIG. 6 is a block diagram illustrating a data pipeline of an edge system, in accordance with an embodiment of the present disclosure.

FIG. 6 is a block diagram illustrating a data pipeline 664 of an edge system 600, in accordance with an embodiment of the present disclosure. Any of the edge cluster(s) 110, the edge device(s) 112, or the server/cluster 114 of FIG. 1, the edge computing system 200 of FIG. 2, an edge system configured host the edge manager 467, the controller 466, the container orchestrator 462 of FIG. 4, or the edge system 500 of FIG. 5 may implement the edge system 600.

The data pipeline 664 may include a series of components that are configured to pass a message from one component to the next such that it includes a chronologically ordered stream of messages. The data pipeline 664 may be configured to receive to input data 620, such as source data (e.g., from one of the data source(s) 120, 122 or 124 of FIG. 1 and/or the data source(s) 220 of FIG. 2) or data from another data pipeline.

The data pipeline 664 can be constructed using computing primitives and building blocks, such as VMs, containers, processes, or any combination thereof. In some examples, the stages of the data pipeline 664 may be described using a user interface or REST API, with data ingestion and movement handled by connector components built into the data pipeline 664. Thus, data may be passed between containers of a data pipeline using API calls. As depicted in FIG. 6, the data pipeline 664 may include a group of containers to form a pod that includes a connector 682, a first transformation runtime 683, a pipeline processor 684, a second transformation runtime 685, and a connector 686 each configured to perform various functions within the data pipeline 664 to consume, transform, and produce messages or data.

For example, the pipeline processor 684 may be configured to manage messaging between the connector 682, the first transformation runtime 683, the second transformation runtime 685, and the connector 686. In some examples, the connector 682, the first transformation runtime 683, the second transformation runtime 685, and the connector 686 may all provide acknowledge messages back to the pipeline processor 584 in response to receipt of messages. Thus, the pipeline processor 684 may act as a message broker within the data pipeline 564.

The connector 682 is configured to receive messages of a certain topic from a message system and to provide the received message to the pipeline processor 684. The connector 682 may include a data service connector configured to connect the data pipeline 664 to another data pipeline or a data source connector configured to connect the data pipeline 664 to an external data source. Thus, the message may include source data or data from another data pipeline.

The first transformation runtime 683 may receive messages from the pipeline processor 684 (e.g. provided by the connector 682 and/or the second transformation runtime 685) and is configured to transform the message data using a first runtime environment (e.g., Python, Java, etc.) to apply a respective function or algorithm to received source data to provide the transformed data. The first transformation runtime 683 is further configured to provide the transformed data in a message back to the pipeline processor 684. Similar to the first transformation runtime 683, the second transformation runtime 685 may be configured to receive messages from the pipeline processor 684 (e.g. provided by the connector 682 and/or the second transformation runtime 685) and is configured to transform the message data using a second runtime environment (e.g., Python, Java, etc.) to apply a respective function or algorithm to received source data to provide the transformed data. The second transformation runtime 685 is further configured to provide the transformed data in a message back to the pipeline processor 684. In some examples, the first transformation runtime 683 and the second transformation runtime 685 may be configured to apply common functions or algorithms in different runtime environments. In other examples, the first transformation runtime 683 and the second transformation runtime 685 may be configured to apply a different functions or algorithms in the different runtime environments. The functions or algorithms may include any type of function or algorithm, such as video processing, video encoding, image processing, event detection, alerting, any other function or algorithm, or any combination thereof. Each of the data pipelines may further include processor containers that are configured to manage messaging between connector and transformation containers.). More or fewer than two transformation containers may be included in the data pipeline 664 without departing from the scope of the disclosure.

The connector 686 may include a data mover connector that is configured to receive messages from the pipeline processor 684 and is configured to publish the messages to a certain topic of a message system in order to provide data to external data pipelines. Thus, the topic to which the message is published by the connector 686 may be subscribed to by other data pipelines to further process the data and/or to provide the output data to a data plane.

Figure 7:
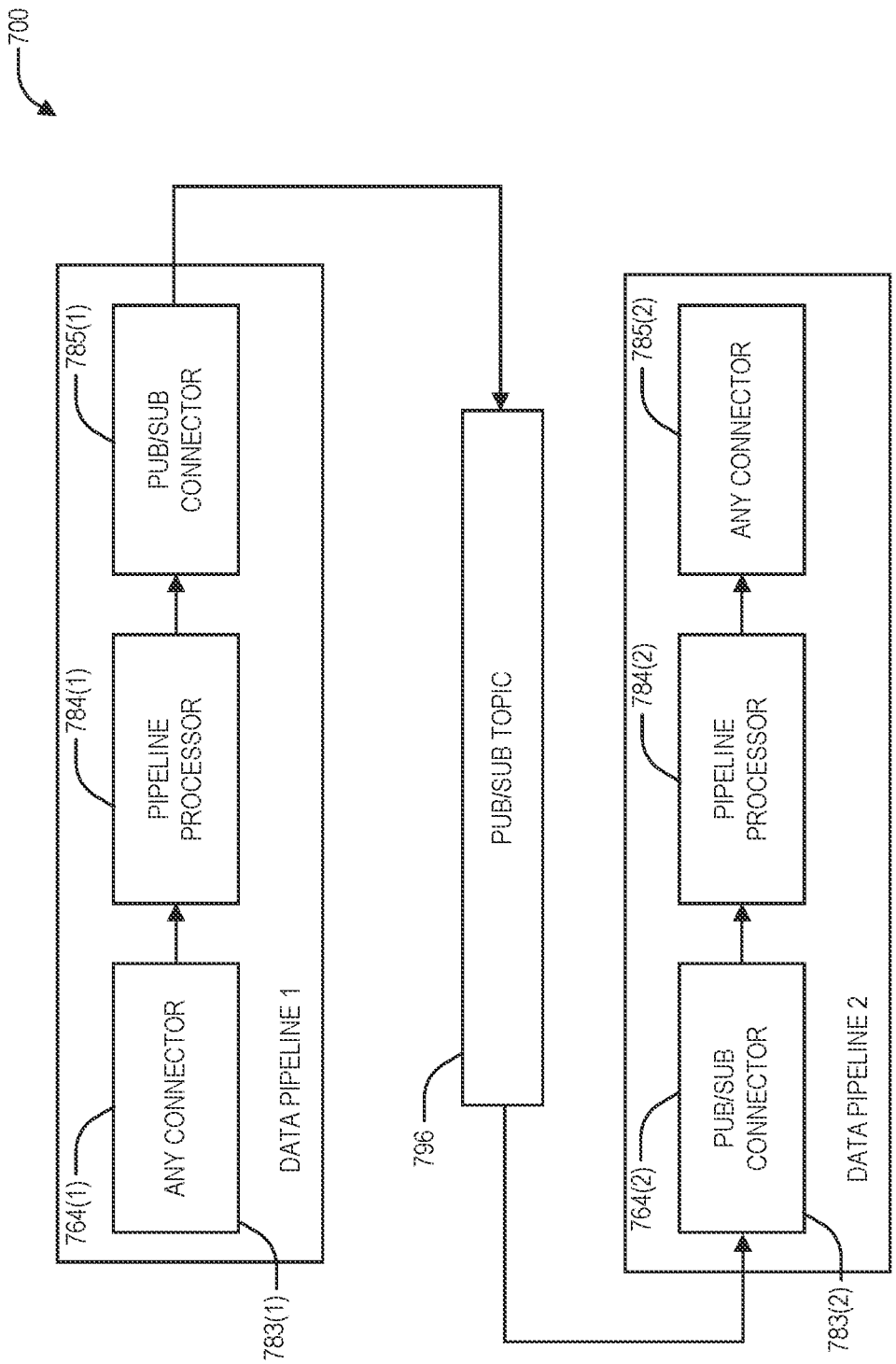
FIG. 7 is a block diagram illustrating multiple data pipelines of an edge system, in accordance with an embodiment of the present disclosure.

FIG. 7 is a block diagram illustrating multiple data pipelines 764(1)-(2) of an IoT system 700, in accordance with an embodiment of the present disclosure. Any of the edge cluster(s) 110, the edge device(s) 112, or the server/cluster 114 of FIG. 1, the edge computing system 200 of FIG. 2, an edge system configured host the edge manager 467, the controller 466, the container orchestrator 462 of FIG. 4, or the edge system 500 of FIG. 5, or the edge system 600 of FIG. 6 may implement the edge system 700.

The data pipelines 764(1)-(2) may be connected to one another via a pub/sub topic 796. The data pipeline 764(1) may be configured to receive to input data, such as source data (e.g., from one of the data source(s) 120, 122 or 124 of FIG. 1 and/or the data source(s) 220 of FIG. 2) or data from another data pipeline and to publish output data to the pub/sub topic 796. The data pipeline 764(1) may be configured to receive the data from the pub/sub topic 796 and to provide output data.

Within the data pipeline 764(1), the pipeline processor 784(1) may be configured to manage messaging between the connector 783(1) and the pub/sub connector 785(1). The connector 783(1) may include a data service connector configured to connect the data pipeline 764(1) to another data pipeline or a data source connector configured to connect the data pipeline 764(1) to an external data source. The pub/sub connector 785(1) may include a data mover connector configured to connect the data pipeline 764(1) to the data pipeline 764(2) via the pub/sub topic 796.

Within the data pipeline 764(2), the pipeline processor 784(2) may be configured to manage messaging between the pub/sub connector 783(2) and the connector 785(2). The pub/sub connector 783(2) may include a data service connector configured to connect the data pipeline 764(2) to the data pipeline 764(1) via the pub/sub topic 796. The connector 785(2) may include a data mover connector configured to connect the data pipeline 764(2) to another data pipeline or a configuration server connected to a data plane.

Figure 8:
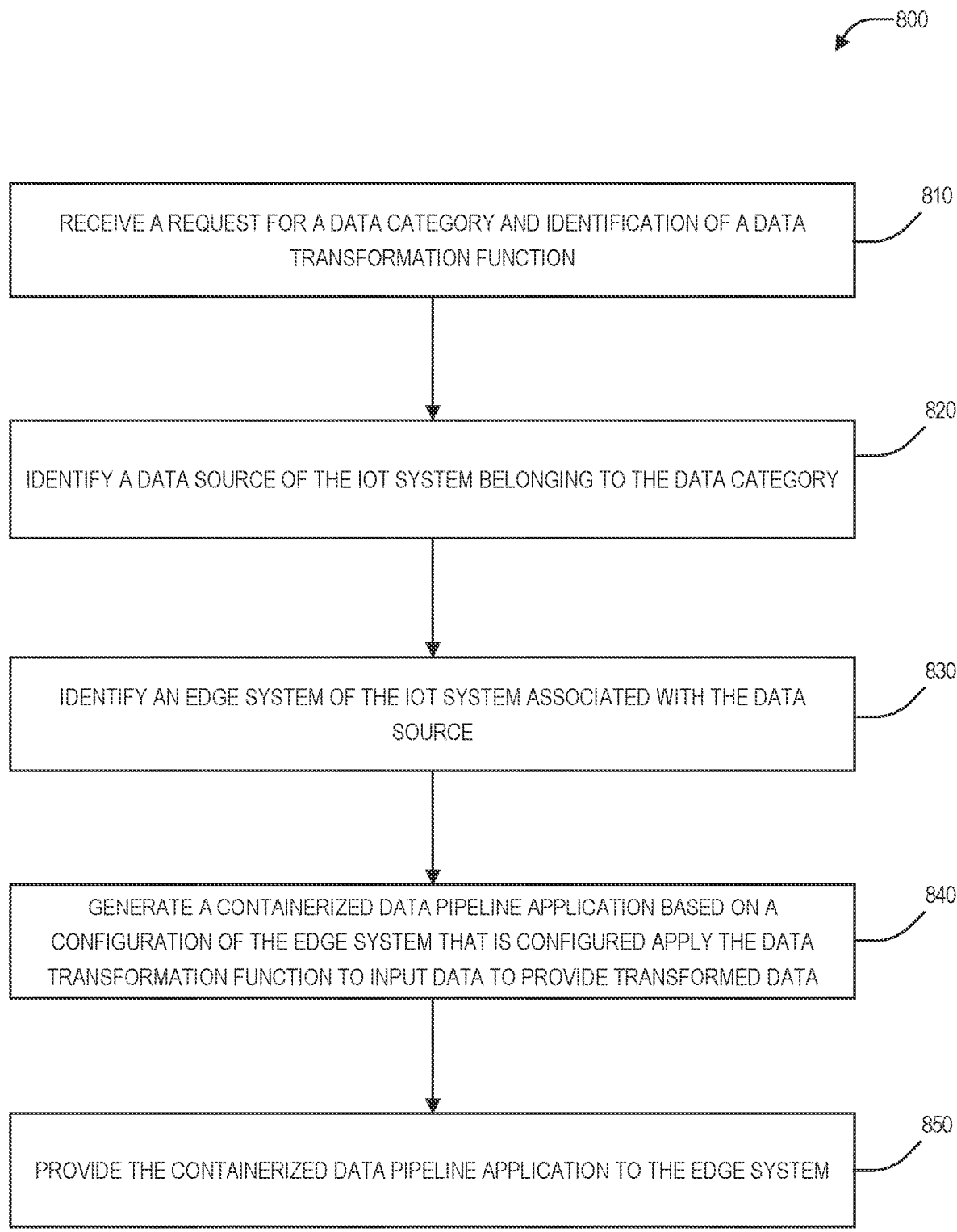
FIG. 8 is a flow diagram of a method to generate and deploy a containerized data pipeline application in an IoT system, in accordance with an embodiment of the present disclosure.

FIG. 8 is a flow diagram of a method 800 to generate and deploy a containerized data pipeline application in an IoT system, in accordance with an embodiment of the present disclosure. The method 800 may be performed by the centralized IoT manager 142 of FIG. 1 and/or any one or more (e.g., including in combination) of the centralized IoT manager instances 324(1)-(N) of FIG. 3. The containerized data pipeline application may include a data pipeline hosted on any of the edge stacks 111, 113, or 116 of FIG. 1, any of the data pipelines 264 of FIG. 2, the data pipeline 564 of FIG. 5, the data pipeline 664 of FIG. 6, the data pipelines 764(1)-(2) of FIG. 7, or any combination thereof.

The method 800 may include receiving a request for a data category and identification of a data transformation function, at 810. In some examples, the data category includes a type of data, a location of data, a source of data, or any combination thereof. The data transformation function may include any type of function or algorithm, such as video processing, video encoding, image processing, event detection, alerting, any other function or algorithm, or any combination thereof.

The method 800 may include identifying a data source of the IoT system belonging to the data category, at 820. The data source may include any of the data source(s) 120, 122, 124 of FIG. 1 and/or the data source(s) 220 of FIG. 2. The data source includes a camera, a temperature sensor, a microphone or transducer, a motion detector, another edge system of the IoT system, or any combination thereof.

The method 800 may include identifying an edge system of the IoT system associated with the data source, at 830. The edge system may include a cluster of computing devices (e.g., the edge cluster 110 of FIG. 1), a computing device (e.g., the edge device 112 of FIG. 1), a virtual machine (e.g., the edge VM 115 of FIG. 1), or any combination thereof. In some examples, the method 800 may further include determining a configuration of the edge system.

The method 800 may include generating a containerized data pipeline application based on a configuration of the edge system that is configured apply the data transformation function to source data from the data source to provide transformed data, at 840. The input data may include data from a data source (e.g., any of the data source(s) 120, 122, 124 of FIG. 1 and/or the data source(s) 220 of FIG. 2), data from another data pipeline or application (e.g., a data pipeline or application of any of the edge stacks 111, 113, or 116, any of the applications 263 or the data pipelines 264 of FIG. 2, the data pipeline 564 of FIG. 5, the data pipeline 664 of FIG. 6, any of the data pipelines 764(1)-(2) of FIG. 7, or any combination thereof, and/or the input data 620 of FIG. 6. In some examples, the method 800 may further include building a transformation container with the data transformation function configured to transform the source data from the data source to the transformed data. The containerized data pipeline application includes the transformation container. The transformation container may be adapted for a particular runtime environment (e.g., Python, Java, etc.). In some examples, the method 800 may further include building a second transformation container with the data transformation function configured to transform the source data from the data source to the transformed data for a second runtime environment that is different than a runtime environment that the transformation container is adapted for.

In some examples, the method 800 may further include building a subscriber container to configure to receive the source data from the data source and provide the source data to the transformation container. The containerized data pipeline application may include the subscriber container. In some examples, the method 800 may further include building a publisher container configured to provide the transformed data from the transformation container to an output of the data pipeline application, in some examples, the method 800 may further include building a processor container configured to manage messaging between components of the data pipeline application. That is, the processor container may be configured to manage messaging between the subscriber, transformation, and publisher containers.

The method 800 may include provide the containerized data pipeline application to the edge system, at 850. In some examples, the method 800 may further include generating a second containerized data pipeline application based on a configuration of a second identified edge system associated with a second data source belonging to the data category. The second containerized data pipeline application may be configured apply the data transformation function to second input data to provide second transformed data. In some examples, the configuration of the second edge system is different than the configuration of the edge system.

Figure 9:
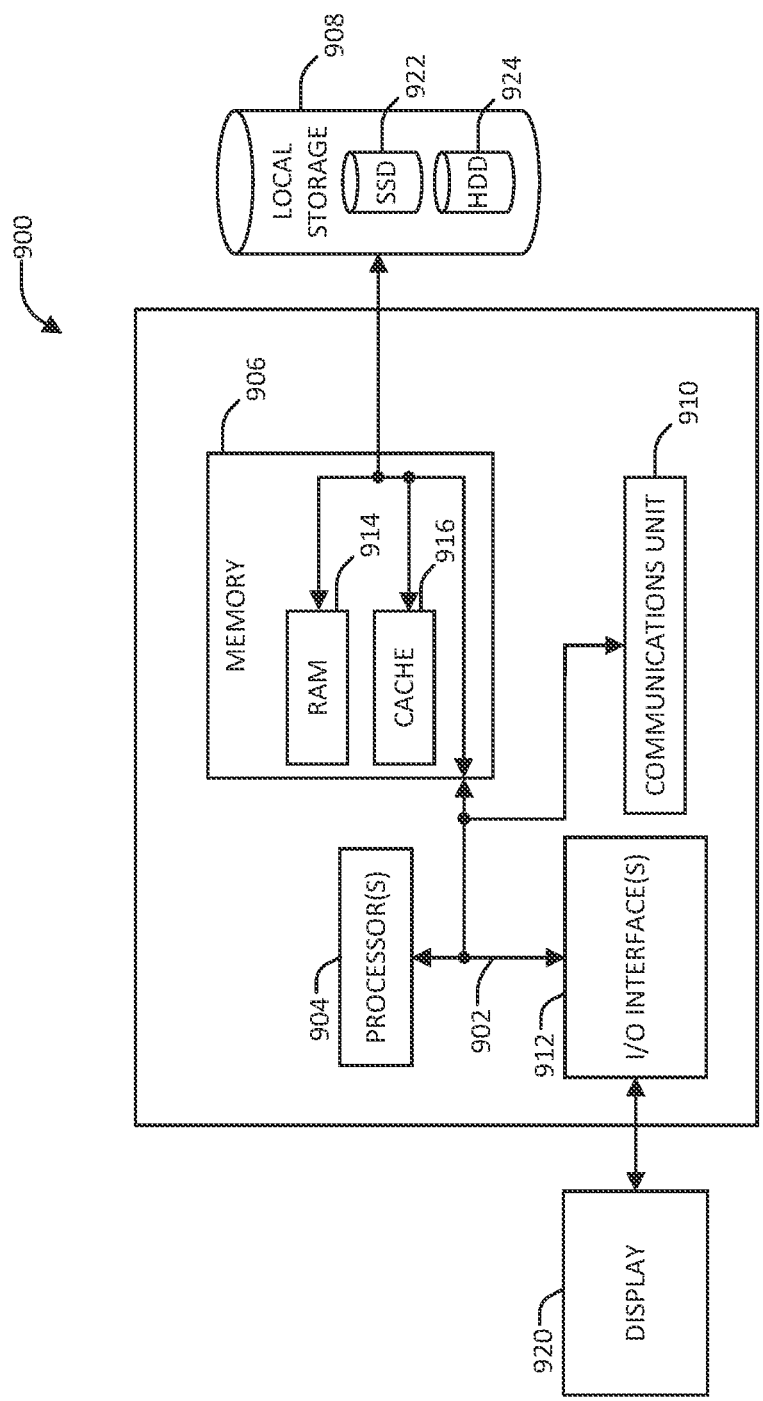
FIG. 9 is a block diagram of components of an edge system or computing in accordance with an embodiment of the present disclosure.

FIG. 9 depicts a block diagram of components of an edge system and/or a computing node (device) 900 in accordance with an embodiment of the present disclosure. It should be appreciated that FIG. 9 provides only an illustration of one implementation and does not imply any limitations with regard to the environments in which different embodiments may be implemented. Many modifications to the depicted environment may be made. The device 900 may implemented as any of an edge device or VM of the edge cluster(s) 110, the edge device(s) 112, the server/cluster 114, a computing node of the central IoT computing system 140, or a computing node of the data computing system 150 of FIG. 1, all or part of the edge computing system 200 of FIG. 2, any of the computing nodes 304(1)-(N) of FIG. 3, systems configured to host any of the centralized IoT manager 424, the edge manager 467, the controller 466, or the container orchestrator 462 of FIG. 4, the edge system 500 of FIG. 5, one or more edge systems configured to host the data pipeline 664 of the IoT system 600 of FIG. 6, one or more edge systems configured to host the data pipelines 764(1)-(2) of the IoT system 700 of FIG. 7, or any combination thereof. The device 900 may be configured to implement the method 800 of FIG. 8 to generate and distribute a containerized data pipeline application in an IoT system.

The device 900 includes a communications fabric 902, which provides communications between one or more processor(s) 904, memory 906, local storage 908, communications unit 910, I/O interface(s) 912. The communications fabric 902 can be implemented with any architecture designed for passing data and/or control information between processors (such as microprocessors, communications and network processors, etc.), system memory, peripheral devices, and any other hardware components within a system. For example, the communications fabric 902 can be implemented with one or more buses.

The memory 906 and the local storage 908 are computer-readable storage media. In this embodiment, the memory 906 includes random access memory RAM 914 and cache 916. In general, the memory 906 can include any suitable volatile or non-volatile computer-readable storage media. The local storage 908 may be implemented as described above with respect to local storage 306(1)-(N) and/or local storage network 370 of FIG. 3. In this embodiment, the local storage 908 includes an SSD 922 and an HDD 924, which may be implemented as described above with respect to any of SSD 340(1)-(N) and any of HDD 342(1)-(N), respectively.

Various computer instructions, programs, files, images, etc. may be stored in local storage 908 for execution by one or more of the respective processor(s) 904 via one or more memories of memory 906. In some examples, local storage 908 includes a magnetic HDD 924. Alternatively, or in addition to a magnetic hard disk drive, local storage 908 can include the SSD 922, a semiconductor storage device, a read-only memory (ROM), an erasable programmable read-only memory (EPROM), a flash memory, or any other computer-readable storage media that is capable of storing program instructions or digital information.

The media used by local storage 908 may also be removable. For example, a removable hard drive may be used for local storage 908. Other examples include optical and magnetic disks, thumb drives, and smart cards that are inserted into a drive for transfer onto another computer-readable storage medium that is also part of local storage 908.

Communications unit 910, in these examples, provides for communications with other data processing systems or devices. In these examples, communications unit 910 includes one or more network interface cards. Communications unit 910 may provide communications through the use of either or both physical and wireless communications links.

I/O interface(s) 912 allows for input and output of data with other devices that may be connected to device 900. For example, I/O interface(s) 912 may provide a connection to external device(s) 918 such as a keyboard, a keypad, a touch screen, and/or some other suitable input device. External device(s) 918 can also include portable computer-readable storage media such as, for example, thumb drives, portable optical or magnetic disks, and memory cards. Software and data used to practice embodiments of the present disclosure can be stored on such portable computer-readable storage media and can be loaded onto local storage 908 via I/O interface(s) 912. I/O interface(s) 912 also connect to a display 920.

Display 920 provides a mechanism to display data to a user and may be, for example, a computer monitor.

Various features described herein may be implemented in hardware, software executed by a processor, firmware, or any combination thereof. If implemented in software (e.g., in the case of the methods described herein), the functions may be stored on or transmitted over as one or more instructions or code on a computer-readable medium. Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), or optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

From the foregoing it will be appreciated that, although specific embodiments of the disclosure have been described herein for purposes of illustration, various modifications may be made without deviating from the spirit and scope of the disclosure. Accordingly, the disclosure is not limited except as by the appended claims.

What is claimed is:

1. At least one non-transitory computer-readable storage medium including instructions that, when executed, cause a system to:
generate a project construct and associate, by a centralized system manager, the project construct with an edge system of a distributed computing system;
in response to a request to generate a containerized data pipeline application associated with the project construct:
identify the edge system of the distributed computing system that is associated with the project construct; and
generate, by the centralized system manager for the edge system, the containerized data pipeline application based at least on hardware configuration information for the edge system, wherein the containerized data pipeline application includes:
a transformation container configured to apply a data transformation function to input data to provide transformed data; and
a processor container configured to manage messaging between components of the containerized data pipeline application.

2. The at least one computer-readable storage medium of claim 1, wherein the instructions further cause the system to:
identify a computing device of the distributed computing system that is connected to a data source of the distributed computing system belonging to a target category of data sources, and
identify the data source of the distributed computing system belonging to the target category of data sources.

3. The at least one computer-readable storage medium of claim 1, wherein the instructions further cause the system to provide the containerized data pipeline application to the edge system.

4. The at least one computer-readable storage medium of claim 1, wherein the instructions further cause the system to generate the containerized data pipeline application based on a hardware configuration of the edge system.

5. The at least one computer-readable storage medium of claim 2, wherein the instructions further cause the system to generate, for inclusion in the containerized data pipeline application, a subscriber container configured to provide received source data from the data source to the transformation container.

6. The at least one computer-readable storage medium of claim 1, wherein the instructions further cause the system to build a publisher container configured to provide the transformed data from the transformation container to an output of the containerized data pipeline application.

7. The at least one computer-readable storage medium of claim 1, wherein the instructions further cause the system to generate the containerized data pipeline application based further on a configuration of the edge system.

8. The at least one computer-readable storage medium of claim 1, wherein the instructions further cause the system to generate a second containerized data pipeline application based on a hardware configuration of a second identified edge system of the distributed computing system, wherein the second containerized data pipeline application is associated with a second project construct.

9. The at least one computer-readable storage medium of claim 8, wherein the second containerized data pipeline application is configured to apply the data transformation function to second input data from the second edge system to provide second transformed data.

10. The at least one computer-readable storage medium of claim 8, wherein the hardware configuration of the second identified edge system is different than the configuration of the edge system.

11. The at least one computer-readable storage medium of claim 2, wherein the computing device comprises a virtual machine.

12. The at least one computer-readable storage medium of claim 2, wherein the instructions further cause the system to receive, with the request, a type of data, a location of data, a source of data, or any combination thereof as the target data category.

13. An edge system comprising:
a memory configured to store instructions, and
a processor configured to execute the instructions, wherein, when executed, the instructions cause the processor to host a data pipeline associated with a project construct, wherein the data pipeline was generated by a centralized system manager for the edge system based at least on configuration information associated with the edge system, and wherein the project construct is associated with the edge system of a distributed computing system by the centralized system manager, the data pipeline comprising:
a transformation container adapted for a runtime environment and configured to receive a message having input data from a connected data source of a target category of data sources and to apply a data transformation function to the input data to provide transformed data; and
a processor container configured to manage messaging between components of the data pipeline; and
a container orchestrator configured to deploy the data pipeline.

14. The edge system of claim 13, wherein the data pipeline further includes a connector container configured to receive input data from the connected data source and to provide the message having the input data to the transformation container.

15. The edge system of claim 14, wherein the connector container includes a data source connector configured to receive data from the connected data source.

16. The edge system of claim 14, wherein the connector container includes a data service connector configured to receive data from another data pipeline of the distributed computing system.

17. The edge system of claim 13, wherein the data pipeline further includes another connector container configured to provide the transformed data in a message at an output of the data pipeline.

18. The edge system of claim 13, wherein the data pipeline further includes a second transformation container adapted for a second runtime environment that is different than the runtime environment and configured to apply a second data transformation function to the input data.

19. A method, comprising:
generating a project construct and associating, by a centralized system manager, the project construct with an edge system of a distributed computing system;
in response to a request to generate a containerized data pipeline application associated with the project construct at the centralized system manager of the distributed computing system:
identifying the edge system of the distributed computing system that is associated with the project construct; and
generating, by the centralized system manager for the edge system, the containerized data pipeline application based at least on hardware configuration information for the edge system, wherein the containerized data pipeline application includes:
a transformation container configured to apply a data transformation function to input data to provide transformed data; and
a processor container configured to manage messaging between components of the containerized data pipeline application.

20. The method of claim 19, further comprising:
identifying a computing device of the distributed computing system that is connected to a data source of the distributed computing system belonging to a target category of data sources, and
identifying the data source of the distributed computing system belonging to the target category of data sources.

21. The method of claim 20, further comprising providing the containerized data pipeline application to the computing device.

22. The method of claim 19, further comprising generating the containerized data pipeline application based on a hardware configuration, including the hardware configuration information, of the edge system.

23. The method of claim 20, further comprising generating, for inclusion in the containerized data pipeline application, a subscriber container configured to provide received source data from the data source to the transformation container.

24. The method of claim 19, further comprising building a publisher container configured to provide the transformed data from the transformation container to an output of the containerized data pipeline application.

25. The method of claim 19, further comprising generating the containerized data pipeline application to based further on a runtime configuration of the computing device.

26. The method of claim 19, further comprising generating a second containerized data pipeline application based on a hardware configuration of a second identified edge system of the distributed computing system, wherein the second containerized data pipeline application is associated with a second project construct.

27. The method of claim 26, wherein the second containerized data pipeline application is configured apply the data transformation function to second input data from the second edge system to provide second transformed data.

28. The method of claim 26, wherein the hardware configuration of the second identified edge system is different than the hardware configuration of the edge system.

29. The method of claim 20, wherein the computing device comprises a virtual machine.

30. The method of claim 20, further comprising receiving, with the request, a type of data, a location of data, a source of data, or any combination thereof as the target data category.

31. At least one non-transitory computer-readable storage medium including instructions that, when executed, cause a system to:
provide a containerized data pipeline associated with a project construct associated with an edge system of a distributed computing system by a centralized system manager, wherein the containerized data pipeline is generated by the centralized system manager for the edge system based at least on configuration information associated with the edge system, the containerized data pipeline comprising:
a transformation container configured to apply a data transformation function to input data in accordance with a category of the input data, to provide transformed data, wherein the input data is received from a connected data source of a target category of data sources; and a processor container configured to manage messaging between components of the containerized data pipeline.

32. The at least one computer-readable storage medium of claim 31, wherein the instructions further cause the system to provide a container orchestrator configured to deploy the containerized data pipeline.

33. The at least one computer-readable storage medium of claim 31, wherein the containerized data pipeline further includes a subscriber container configured to provide received source data from the connected data source to the transformation container.

34. The at least one computer-readable storage medium of claim 31, wherein the data pipeline further includes a publisher container configured to provide the transformed data from the transformation container to an output of the containerized data pipeline.

35. The at least one computer-readable storage medium of claim 1, wherein the instructions further cause the system to provide a second containerized data pipeline, wherein the second containerized data pipeline is associated with the project construct.

\* \* \* \* \*